(12) United States Patent
Ibrahim et al.

(10) Patent No.: US 12,425,900 B2
(45) Date of Patent: Sep. 23, 2025

(54) CROSS-LINK INTERFERENCE REPORTING CONFIGURATION AND PAYLOAD DESIGN

(71) Applicant: QUALCOMM Incorporated, San Diego, CA (US)

(72) Inventors: Abdelrahman Mohamed Ahmed Mohamed Ibrahim, San Diego, CA (US); Muhammad Sayed Khairy Abdelghaffar, San Jose, CA (US); Huilin Xu, Temecula, CA (US); Seyedkianoush Hosseini, San Diego, CA (US); Ahmed Attia Abotabl, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 453 days.

(21) Appl. No.: 17/733,833

(22) Filed: Apr. 29, 2022

(65) Prior Publication Data

US 2023/0354074 A1   Nov. 2, 2023

(51) Int. Cl.
*H04W 24/10* (2009.01)
*H04B 7/0417* (2017.01)
(Continued)

(52) U.S. Cl.
CPC .......... *H04W 24/10* (2013.01); *H04B 7/0417* (2013.01); *H04B 7/0626* (2013.01); *H04B 17/336* (2015.01); *H04L 5/0051* (2013.01)

(58) Field of Classification Search
CPC ... H04W 24/10; H04B 17/336; H04B 7/0417; H04B 7/0626; H04L 5/0051
(Continued)

(56) References Cited

U.S. PATENT DOCUMENTS 12,127,025 B2   10/2024   Ibrahim et al.
2021/0067991 A1   3/2021   Zhu et al.
(Continued)

FOREIGN PATENT DOCUMENTS

WO   WO-2021080720 A1   4/2021
WO   WO-2021217287 A1   11/2021
(Continued)

OTHER PUBLICATIONS

International Search Report and Written Opinion—PCT/US2023/065605—ISA/EPO—Sep. 20, 2023 (2201388U1WO).
(Continued)

*Primary Examiner* — Nicholas R Taylor
*Assistant Examiner* — Chong G Kim
(74) *Attorney, Agent, or Firm* — Holland & Hart LLP

(57) ABSTRACT

Methods, systems, and devices for wireless communications are described. In one aspect, a UE may report channel state feedback (CSF) to a network entity based on channel state information (CSI) measurements and CLI measurements. In another aspect, a UE may explicitly report CLI measurements to a network entity. In yet another aspect, a UE may report a signal-to-interference-plus-noise ratio (SINR) to a network entity based on CLI measurements, and the network entity may trigger the UE to perform further CLI measurements on signals received from other UEs based on the SINR. In yet another aspect, a UE may generate a report using CLI measurements based on whether the UE is allocated enough time to generate and transmit the report. In yet another aspect, a UE may identify a suitable priority for reporting CLI to a network entity.

20 Claims, 28 Drawing Sheets

(51) Int. Cl.
  *H04B 7/06* (2006.01)
  *H04B 17/336* (2015.01)
  *H04L 5/00* (2006.01)

(58) Field of Classification Search
  USPC .......................................................... 370/329
  See application file for complete search history.

(56) References Cited

U.S. PATENT DOCUMENTS

| | | | |
|---|---|---|---|
| 2021/0144574 A1* | 5/2021 | Jin | H04L 5/0048 |
| 2021/0368377 A1* | 11/2021 | Shi | H04W 80/02 |
| 2022/0124531 A1* | 4/2022 | Miao | H04B 17/345 |
| 2023/0319605 A1* | 10/2023 | Park | H04L 5/00 370/252 |
| 2023/0327787 A1 | 10/2023 | Bai et al. | |
| 2023/0328564 A1 | 10/2023 | Bai et al. | |
| 2023/0353262 A1 | 11/2023 | Ibrahim et al. | |
| 2023/0354073 A1 | 11/2023 | Ibrahim et al. | |

FOREIGN PATENT DOCUMENTS

| | | |
|---|---|---|
| WO | WO-2022032522 A1 | 2/2022 |
| WO | WO-2022055816 A1 | 3/2022 |

OTHER PUBLICATIONS

Partial International Search Report—PCT/US2023/065605—ISA/EPO—Jul. 19, 2023 (2201388U1WO).
3GPP: "3rd Generation Partnership Project, Technical Specification Group Radio Access Network, NR, Multiplexing and channel coding(Release 17)", 3GPP TS 38.212 V17.0.0, Dec. 2021, pp. 1-184, p. 55, Sophia Antipolis Valbonne, France.
3GPP: "3rd Generation Partnership Project, Technical Specification Group Radio Access Network, NR, Physical layer procedures for data (Release 17)", 3GPP TS 38.214, V17.0.0, Dec. 2021, pp. 1-216, pp. 117-120 and 128-129, Sophia Antipolis Valbonne, France.
Samsung (Moderator): "Draft SID on Evolution of NR Duplex Operation", RP-212707, 3GPP TSG RAN#94-e, Electronic Meeting, Dec. 6-17, 2021, 4 Pages.

* cited by examiner 200-a 200-b

400

CROSS-LINK INTERFERENCE REPORTING CONFIGURATION AND PAYLOAD DESIGN

FIELD OF TECHNOLOGY

The following relates to wireless communications, including cross-link interference (CLI) reporting configuration and payload design.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM).

A wireless multiple-access communications system may include one or more base stations, each supporting wireless communication for communication devices, which may be known as user equipment (UE). As the number of UEs in a wireless communications system increases, the number of connections and signaling in the wireless communications system may increase, and interference between the UEs may increase. For instance, communications between a UE and a network entity may interfere with communications between another UE and the network entity, or communications between a UE and a network entity may interfere with communications between another UE and another network entity. Improved techniques for minimizing interference in a wireless communications system may be desirable.

SUMMARY

The described techniques relate to improved methods, systems, devices, and apparatuses that support cross-link interference (CLI) reporting. Generally, the described techniques provide for generating and reporting CLI to facilitate techniques at a network entity or a user equipment (UE) for minimizing CLI. In one aspect, a UE may report channel state feedback (CSF) to a network entity based on channel state information (CSI) measurements and CLI measurements. In another aspect, a UE may explicitly report CLI measurements to a network entity. The report of the CLI measurements may include a first set of fields including indicators for CLI measurements and a second set of fields including the CLI measurement values. In yet another aspect, a UE may report a signal-to-interference-plus-noise ratio (SINR) to a network entity based on CLI measurements, and the network entity may trigger the UE to perform further CLI measurements on signals received from other UEs based on the SINR. In yet another aspect, a UE may generate a report using CLI measurements based on whether the UE is allocated enough time to generate and transmit the report. For instance, the content of the CLI report may differ based on whether the UE is allocated enough time to generate and transmit the report. In yet another aspect, a UE may identify a suitable priority for reporting CLI to a network entity.

A method for wireless communication at a user equipment (UE) is described. The method may include receiving first signaling indicating a first configuration including a first set of resources for channel state information measurements and a second set of resources for first cross-link interference measurements, performing the channel state information measurements on the first set of resources and the first cross-link interference measurements on the second set of resources, generating first channel state feedback based on the channel state information measurements and the first cross-link interference measurements, and reporting the first channel state feedback.

An apparatus for wireless communication at a UE is described. The apparatus may include a processor, memory coupled with the processor, and instructions stored in the memory. The instructions may be executable by the processor to cause the apparatus to receive first signaling indicating a first configuration including a first set of resources for channel state information measurements and a second set of resources for first cross-link interference measurements, perform the channel state information measurements on the first set of resources and the first cross-link interference measurements on the second set of resources, generate first channel state feedback based on the channel state information measurements and the first cross-link interference measurements, and report the first channel state feedback.

Another apparatus for wireless communication at a UE is described. The apparatus may include means for receiving first signaling indicating a first configuration including a first set of resources for channel state information measurements and a second set of resources for first cross-link interference measurements, means for performing the channel state information measurements on the first set of resources and the first cross-link interference measurements on the second set of resources, means for generating first channel state feedback based on the channel state information measurements and the first cross-link interference measurements, and means for reporting the first channel state feedback.

A non-transitory computer-readable medium storing code for wireless communication at a UE is described. The code may include instructions executable by a processor to receive first signaling indicating a first configuration including a first set of resources for channel state information measurements and a second set of resources for first cross-link interference measurements, perform the channel state information measurements on the first set of resources and the first cross-link interference measurements on the second set of resources, generate first channel state feedback based on the channel state information measurements and the first cross-link interference measurements, and report the first channel state feedback.

Some examples of the method, apparatuses, and non-transitory computer-readable medium described herein may further include operations, features, means, or instructions for reporting the first channel state feedback based on the first configuration excluding a metric to trigger reporting of the first cross-link interference measurements.

Some examples of the method, apparatuses, and non-transitory computer-readable medium described herein may further include operations, features, means, or instructions for receiving second signaling indicating a second configuration including a metric to trigger reporting of second cross-link interference measurements and reporting the second cross-link interference measurements based on the metric.

Some examples of the method, apparatuses, and non-transitory computer-readable medium described herein may further include operations, features, means, or instructions for receiving channel state information reference signals on the first set of resources, where performing the channel state information measurements includes and performing the channel state information measurements on the channel state information reference signals received on the first set of resources.

Some examples of the method, apparatuses, and non-transitory computer-readable medium described herein may further include operations, features, means, or instructions for receiving sounding reference signals on the second set of resources, where performing the first cross-link interference measurements includes and performing the first cross-link interference measurements on the sounding reference signals received on the second set of resources.

In some examples of the method, apparatuses, and non-transitory computer-readable medium described herein, receiving the first signaling indicating the first configuration may include operations, features, means, or instructions for receiving the first signaling indicating the first configuration including a third set of resources for channel state information interference measurements. The method may further include performing the channel state information interference measurements on the third set of resources, where generating the first channel state feedback may be further based on the channel state information interference measurements.

A method for wireless communication at a UE is described. The method may include receiving sounding reference signals on a set of resources configured for cross-link interference measurements, performing the cross-link interference measurements on the sounding reference signals, generating a cross-link interference report including a first set of fields including indicators of at least a subset of the cross-link interference measurements and a second set of fields including the at least the subset of the cross-link interference measurements, and transmitting the cross-link interference report.

An apparatus for wireless communication at a UE is described. The apparatus may include a processor, memory coupled with the processor, and instructions stored in the memory. The instructions may be executable by the processor to cause the apparatus to receive sounding reference signals on a set of resources configured for cross-link interference measurements, perform the cross-link interference measurements on the sounding reference signals, generate a cross-link interference report including a first set of fields including indicators of at least a subset of the cross-link interference measurements and a second set of fields including the at least the subset of the cross-link interference measurements, and transmit the cross-link interference report.

Another apparatus for wireless communication at a UE is described. The apparatus may include means for receiving sounding reference signals on a set of resources configured for cross-link interference measurements, means for performing the cross-link interference measurements on the sounding reference signals, means for generating a cross-link interference report including a first set of fields including indicators of at least a subset of the cross-link interference measurements and a second set of fields including the at least the subset of the cross-link interference measurements, and means for transmitting the cross-link interference report.

A non-transitory computer-readable medium storing code for wireless communication at a UE is described. The code may include instructions executable by a processor to receive sounding reference signals on a set of resources configured for cross-link interference measurements, perform the cross-link interference measurements on the sounding reference signals, generate a cross-link interference report including a first set of fields including indicators of at least a subset of the cross-link interference measurements and a second set of fields including the at least the subset of the cross-link interference measurements, and transmit the cross-link interference report.

In some examples of the method, apparatuses, and non-transitory computer-readable medium described herein, performing the cross-link interference measurements may include operations, features, means, or instructions for performing up to a maximum quantity of cross-link interference measurements on the sounding reference signals.

In some examples of the method, apparatuses, and non-transitory computer-readable medium described herein, performing the cross-link interference measurements may include operations, features, means, or instructions for performing a set of multiple cross-link interference measurements on the sounding reference signals, where the at least the subset of the cross-link interference measurements includes up to a maximum quantity of cross-link interference measurements.

In some examples of the method, apparatuses, and non-transitory computer-readable medium described herein, the at least the subset of the cross-link interference measurements includes a highest set of cross-link interference measurements of the set of multiple cross-link interference measurements.

In some examples of the method, apparatuses, and non-transitory computer-readable medium described herein, performing the set of multiple cross-link interference measurements may include operations, features, means, or instructions for performing the set of multiple cross-link interference measurements on each of a set of multiple subbands using a set of multiple beams, where the at least the subset of the cross-link interference measurements includes a highest cross-link interference measurement for each subband of the set of multiple subbands.

In some examples of the method, apparatuses, and non-transitory computer-readable medium described herein, generating the cross-link interference report may include operations, features, means, or instructions for generating a first part of the cross-link interference report including a first subset of the cross-link interference measurements and a second part of the cross-link interference report including a second subset of the cross-link interference measurements based on a quantity of the cross-link interference measurements exceeding a threshold.

In some examples of the method, apparatuses, and non-transitory computer-readable medium described herein, the indicators included in the first set of fields indicate, for each cross-link interference measurement included in the cross-link interference report, a cross-link interference resource, a subband, a beam, or a combination thereof associated with the cross-link interference measurement.

A method for wireless communication at a network entity is described. The method may include receiving, from a first UE, an indication of a first signal-to-interference-plus-noise ratio computed at the first UE based on first cross-link interference measurements performed at the first UE, transmitting, based on the first signal-to-interference-plus-noise ratio, a trigger for a third UE to transmit sounding reference signals to the first UE for second cross-link interference measurements at the first UE, receiving, from the first UE, an indication of a second signal-to-interference-plus-noise ratio computed at the first UE based on the second cross-link interference measurements performed at the first UE, and scheduling communications with the first UE based on the first signal-to-interference-plus-noise ratio and the second signal-to-interference-plus-noise ratio.

An apparatus for wireless communication at a network entity is described. The apparatus may include a processor, memory coupled with the processor, and instructions stored in the memory. The instructions may be executable by the processor to cause the apparatus to receive, from a first UE, an indication of a first signal-to-interference-plus-noise ratio computed at the first UE based on first cross-link interference measurements performed at the first UE, transmit, based on the first signal-to-interference-plus-noise ratio, a trigger for a third UE to transmit sounding reference signals to the first UE for second cross-link interference measurements at the first UE, receive, from the first UE, an indication of a second signal-to-interference-plus-noise ratio computed at the first UE based on the second cross-link interference measurements performed at the first UE, and scheduling communications with the first UE base at least in part on the first signal-to-interference-plus-noise ratio and the second signal-to-interference-plus-noise ratio.

Another apparatus for wireless communication at a network entity is described. The apparatus may include means for receiving, from a first UE, an indication of a first signal-to-interference-plus-noise ratio computed at the first UE based on first cross-link interference measurements performed at the first UE, means for transmitting, based on the first signal-to-interference-plus-noise ratio, a trigger for a third UE to transmit sounding reference signals to the first UE for second cross-link interference measurements at the first UE, means for receiving, from the first UE, an indication of a second signal-to-interference-plus-noise ratio computed at the first UE based on the second cross-link interference measurements performed at the first UE, and means for scheduling communications with the first UE based on the first signal-to-interference-plus-noise ratio and the second signal-to-interference-plus-noise ratio.

A non-transitory computer-readable medium storing code for wireless communication at a network entity is described. The code may include instructions executable by a processor to receive, from a first UE, an indication of a first signal-to-interference-plus-noise ratio computed at the first UE based on first cross-link interference measurements performed at the first UE, transmit, based on the first signal-to-interference-plus-noise ratio, a trigger for a third UE to transmit sounding reference signals to the first UE for second cross-link interference measurements at the first UE, receive, from the first UE, an indication of a second signal-to-interference-plus-noise ratio computed at the first UE based on the second cross-link interference measurements performed at the first UE, and scheduling communications with the first UE base at least in part on the first signal-to-interference-plus-noise ratio and the second signal-to-interference-plus-noise ratio.

DETAILED DESCRIPTION

As the number of user equipments (UEs) in a wireless communications system increases, the number of connections and signaling in the wireless communications system may increase, and interference between the UEs may increase. Interference across links or across connections in a wireless communications system may be referred to as cross-link interference (CLI), and high CLI may result in frequent failed transmissions or excessive retransmissions (e.g., which may reduce throughput and increase overhead). Thus, it may be appropriate for a wireless communications system to support techniques for minimizing CLI to improve throughput and reduce overhead. To minimize CLI, some wireless communications systems may support techniques for configuring or scheduling communications with UEs based on CLI measurements captured at the UEs. In some aspects, however, techniques for generating and reporting CLI measurements may be underdeveloped, and it may be challenging for a wireless communications system to minimize CLI without CLI measurements or without some information related to the CLI measurements.

The techniques described herein provide for efficiently performing CLI measurements and reporting based on the CLI measurements to facilitate techniques at a network entity or a UE for minimizing CLI. In one aspect, a UE may report channel state feedback (CSF) to a network entity based on channel state information (CSI) measurements and CLI measurements. In another aspect, a UE may explicitly report CLI measurements to a network entity. The report of the CLI measurements may include a first set of fields including indicators for the CLI measurements and a second set of fields including the CLI measurement values. In yet another aspect, a UE may report a signal-to-interference-plus-noise ratio (SINR) to a network entity based on CLI measurements, and the network entity may trigger the UE to perform further CLI measurements on signals received from other UEs based on the SINR. In yet another aspect, a UE may generate a report using CLI measurements based on whether the UE is allocated enough time to generate and transmit the report. For instance, the content of the CLI report may differ based on whether the UE is allocated enough time to generate and transmit the report relative to measurement opportunities. In yet another aspect, a UE may identify a suitable priority for reporting CLI to a network entity.

Aspects of the disclosure are initially described in the context of wireless communications systems. Examples of processes and signaling exchanges that support CLI reporting configuration and payload design are then described. Aspects of the disclosure are further illustrated by and described with reference to apparatus diagrams, system diagrams, and flowcharts that relate to CLI reporting configuration and payload design.

Figure 1:
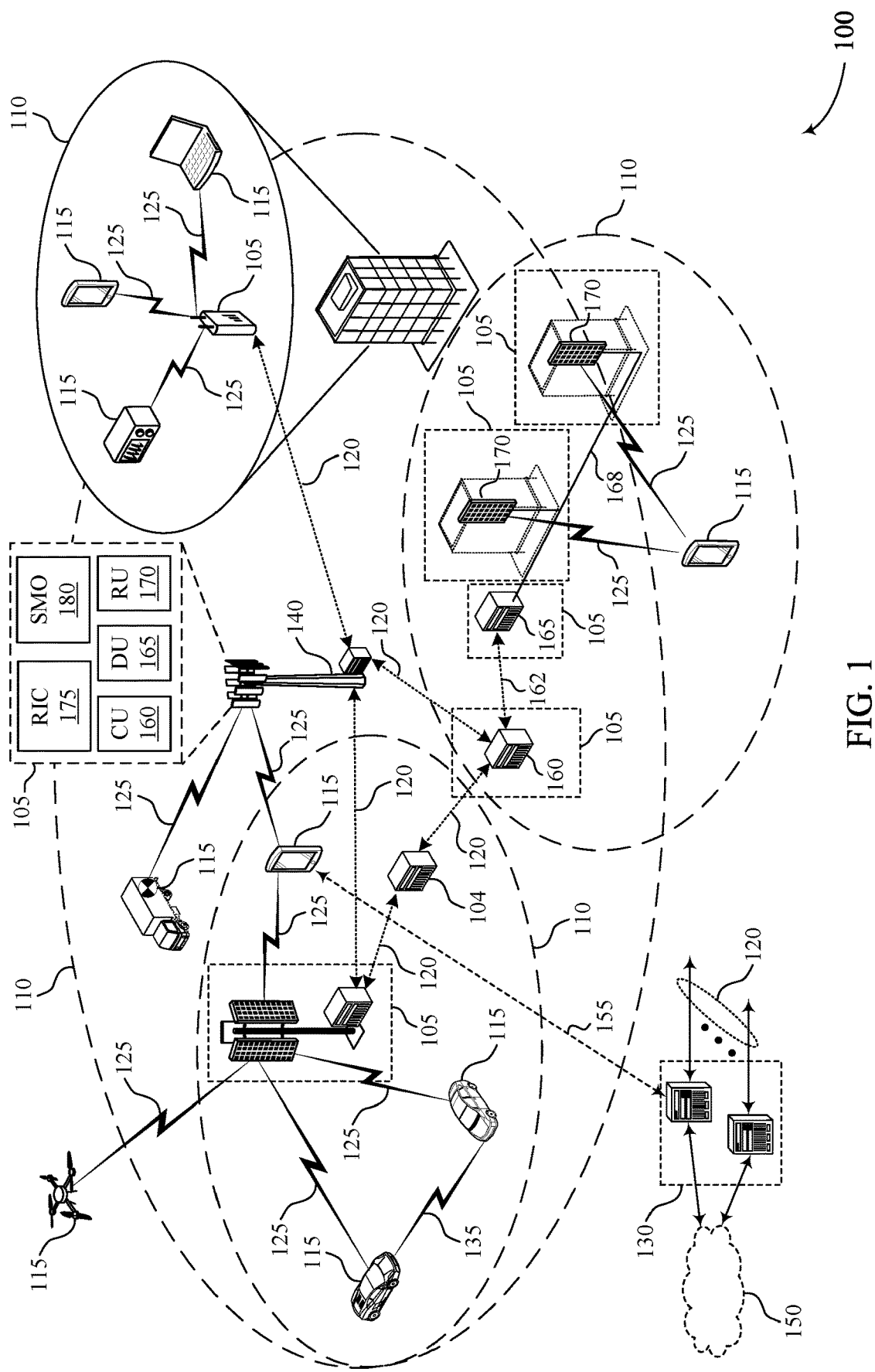
FIG. 1 illustrates an example of a wireless communications system that supports cross-link interference (CLI) reporting configuration and payload design in accordance with one or more aspects of the present disclosure.

FIG. 1 illustrates an example of a wireless communications system 100 that supports CLI reporting configuration and payload design in accordance with one or more aspects of the present disclosure. The wireless communications system 100 may include one or more network entities 105, one or more UEs 115, and a core network 130. In some examples, the wireless communications system 100 may be a Long-Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115 or network entities 105, as shown in FIG. 1.

As described herein, anode of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another over a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 through a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 175 is flexible and may support different functionalities depending upon which functions (e.g., network layer functions, protocol layer functions, baseband functions, RF functions, and any combinations thereof) are performed at a CU 160, a DU 165, or an RU 175. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support CLI reporting configuration and payload design as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be positioned according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115 (e.g., physical downlink control channel (PDCCH) transmissions, physical downlink shared channel (PDSCH) transmissions, channel state information (CSI) reference signal (CSI-RS) transmissions), uplink transmissions (e.g., return link transmissions) from a UE 115 to a network entity 105 (e.g., physical uplink control channel (PUCCH) transmissions, physical uplink shared channel (PUSCH) transmissions, or sounding reference signal (SRS) transmissions), or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications over a particular carrier bandwidth or may be configurable to support communications over one of a set of carrier bandwidths. In some examples, the wireless communications system 100 may include network entities 105 or UEs 115 that support concurrent communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both) such that the more resource elements that a device receives and the higher the order of the modulation scheme, the higher the data rate may be for the device. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, where a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of TS=1/ ($\Delta f_{max} \cdot N_f$) seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., over a carrier) and may be associated with an identifier for distinguishing neighboring cells (e.g., a physical cell identifier (PCID), a virtual cell identifier (VCID), or others). In some examples, a cell may also refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be able to communicate directly with other UEs 115 over a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by or scheduled by the network entity 105. In some examples, one or more UEs 115 in such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without the involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, which may be referred to as clusters, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. While operating in unlicensed RF spectrum bands, devices such as the network entities 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located in diverse geographic locations. A network entity 105 may have an antenna array with a set of rows and columns of antenna ports that the network entity 105 may use to support beamforming of communications with a UE 115. Likewise, a UE 115 may have one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a network entity 105 or a core network 130 supporting radio bearers for user plane data. At the PHY layer, transport channels may be mapped to physical channels.

Some UEs 115 or network entities 105 in wireless communications system 100 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the network entities 105 or UEs 115 include entering a power saving deep sleep mode when not engaging in active communications, operating over a limited bandwidth (e.g., according to narrowband communications), or a combination of these techniques. For example, some network entities 105 or UEs 115 may be configured for operation using a narrowband protocol type that is associated with a defined portion or range (e.g., set of subcarriers or resource blocks (RBs)) within a carrier, within a guard-band of a carrier, or outside of a carrier.

In addition to, or as an alternative to, a half-duplex mode, some network entities 105 or UEs 115 may support a full-duplex mode. A full-duplex mode may refer to a mode that supports two-way communication via simultaneous transmission and reception in the same or overlapping frequency ranges. This two-way communication may be referred to as full-duplex communications. Full-duplex communications is a technique which is capable of theoretically doubling link capacity by enabling radio network nodes to transmit and receive simultaneously on the same frequency and time resource. Full-duplex breaks half-duplex operation constraints where transmission and reception either differ in time or in frequency. A full-duplex network node, such as a network entity 105, UE 115, or both in the cellular network, can communicate simultaneously in uplink and downlink with two half-duplex panels using the same radio resources. For instance, a UE 115 may transmit uplink transmissions from one panel at the UE 115, and the UE 115 may receive downlink transmissions at another panel at the UE 115. Similarly, a network entity 105 may receive uplink transmissions at one panel at the network entity 105, and the network entity 105 may transmit downlink transmissions from another panel at the network entity 105.

Thus, a device equipped with multiple TRPs that supports the capability of simultaneous transmission and reception using the same time-frequency radio resource (e.g., uplink or downlink transmissions in frequency range 2 (FR2) and different associated aspects of procedures) may be referred to as a full-duplex capable device (e.g., full-duplex UE 115 or full-duplex network entity 105). The device may also be capable of working in both the full-duplex mode and backing off to a half-duplex mode. In some cases, a full-duplex capability may be conditional on beam separation and other factors (e.g., self-interference between downlink and uplink and clutter echo at a device). However, full-duplex communications may provide for latency reduction (e.g., since it may be possible to receive a downlink signal in an uplink-only slot, which may enable latency savings), spectrum efficiency enhancement (e.g., per cell or per UE 115), more efficient resource utilization, and coverage enhancements with continuous uplink or downlink transmissions or repetitions.

Figure 2:
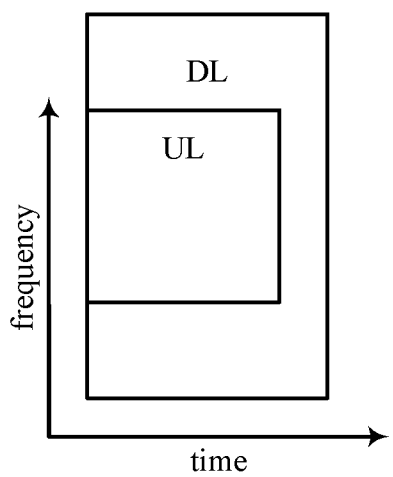
FIG. 2 illustrates an example of different types of full-duplex operations in accordance with one or more aspects of the present disclosure.
Figure 2:
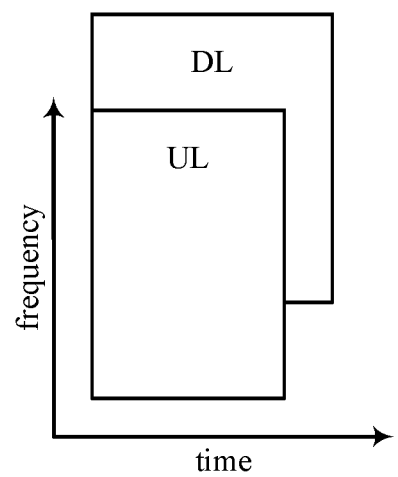
Figure 2:
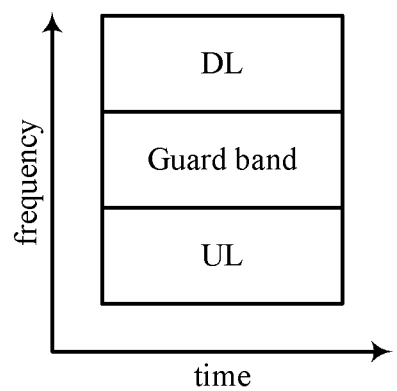

FIG. 2 illustrates examples of different types of full-duplex operations 200 in accordance with one or more aspects of the present disclosure. The first type of full-duplex operation 200-a may be referred to as in-band full-duplex (IBFD) operation. When supporting the first type of full-duplex operation 200-a, a UE 115 or a network device 105 may transmit and receive on the same time and frequency resource. For instance, downlink and uplink may share the same IBFD time or frequency resource (e.g., with full or partial overlapping between the downlink and the uplink). The second type of full-duplex operation 200-b may be referred to as sub-band frequency division duplexing (FDD) operation, sub-band full-duplex (SBFD) or flexible duplex operation. When supporting the second type of full-duplex operation 200-b, a UE 115 or a network device 105 may transmit and receive at the same time but on different frequency resources. In some cases, a downlink resource may be separated from an uplink resource in a frequency domain (e.g., by a guard band).

Figure 3:
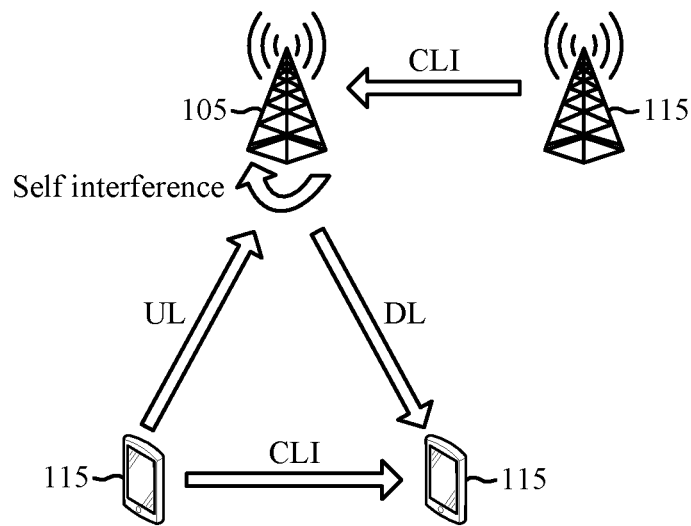
FIG. 3 illustrates an example of full-duplex operation at a first network entity in accordance with one or more aspects of the present disclosure.
Figure 3:
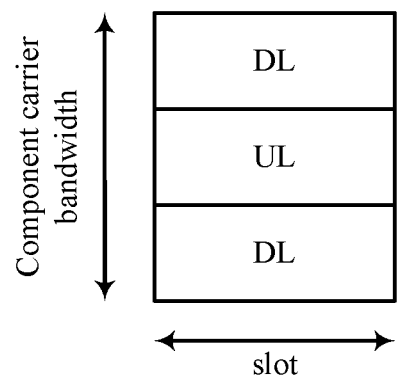

FIG. 3 illustrates an example of full-duplex operation 300 at a first network entity 105 in accordance with one or more aspects of the present disclosure. The first network entity 105 may receive uplink transmissions from a first UE 115 and transmit downlink transmissions to a second UE. The second UE 115 may experience CLI from the uplink transmissions from the first UE 115, and the first network entity 105 may experience CLI from a second network entity 105. The first network entity 105 may also experience self-interference from full-duplex operation since the first network entity 105 may simultaneously receive uplink transmissions from the first UE 115 and transmit downlink transmissions to the second UE. The communications between the first network entity 105 and the first and second UEs 115 may be on non-overlapping uplink and downlink subbands (e.g., SBFD).

Figure 4:
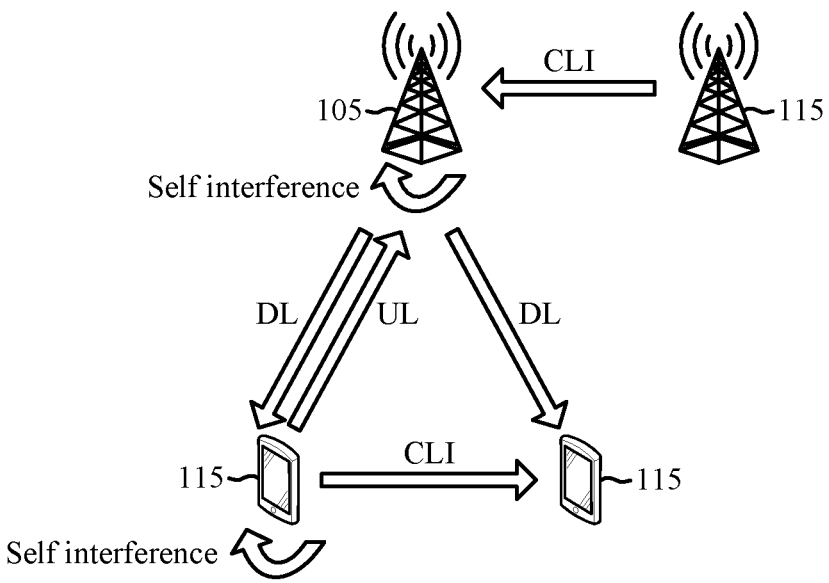
FIG. 4 illustrates an example of full-duplex operation at a first network entity and a first user equipment (UE) in accordance with one or more aspects of the present disclosure.
Figure 4:
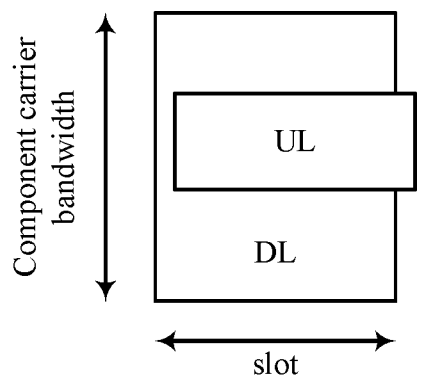

FIG. 4 illustrates an example of full-duplex operation 400 at a first network entity 105 and a first UE 115 in accordance with one or more aspects of the present disclosure. The first network entity 105 may communicate with the first UE 115 and the second UE 115 with partially overlapping uplink and downlink transmissions. A second UE 115 may experience CLI from the uplink transmissions from the first UE 115, and the first network entity 105 may experience CLI from a second network entity 105. The first network entity 105 may also experience self-interference from full-duplex operation since the first network entity 105 may simultaneously receive uplink transmissions from the first UE 115 and transmit downlink transmissions to the second UE 115. The first UE 115 may also experience self-interference from full-duplex operation since the first UE 115 may simultaneously receive downlink transmissions from the first network entity 105 and transmit uplink transmissions to the first network entity 105.

Figure 5:
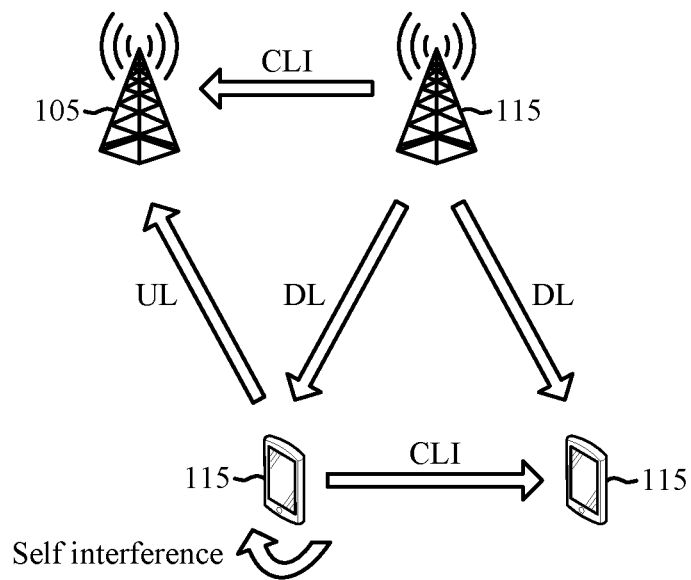
FIG. 5 illustrates an example of full-duplex operation at a first UE in accordance with one or more aspects of the present disclosure.
Figure 5:
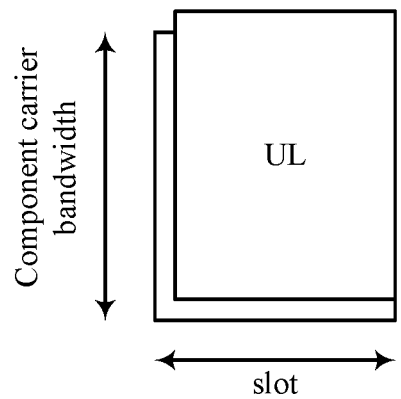

FIG. 5 illustrates an example of full-duplex operation 500 at a first UE 115 in accordance with one or more aspects of the present disclosure. The first UE 115 may be an SBFD UE 115 and may communicate with multiple transmission and reception points (TRPs) with fully overlapping uplink and downlink transmissions. A second UE 115 may experience CLI from uplink transmissions from the first UE 115, and a second network entity 105 may experience CLI from downlink transmissions from the first network entity 105. The first UE 115 may experience self-interference from full-duplex operation since the first UE 115 may simultaneously receive downlink transmissions from the first network entity 105 and transmit uplink transmissions to the second network entity 105.

In wireless communications system 100, to minimize CLI from a network entity 105 to communications at a UE 115, the UE 115 may perform channel state information (CSI) measurements on CSI reference signals (CSI-RSs) received from the network entity 105.

Figure 6:
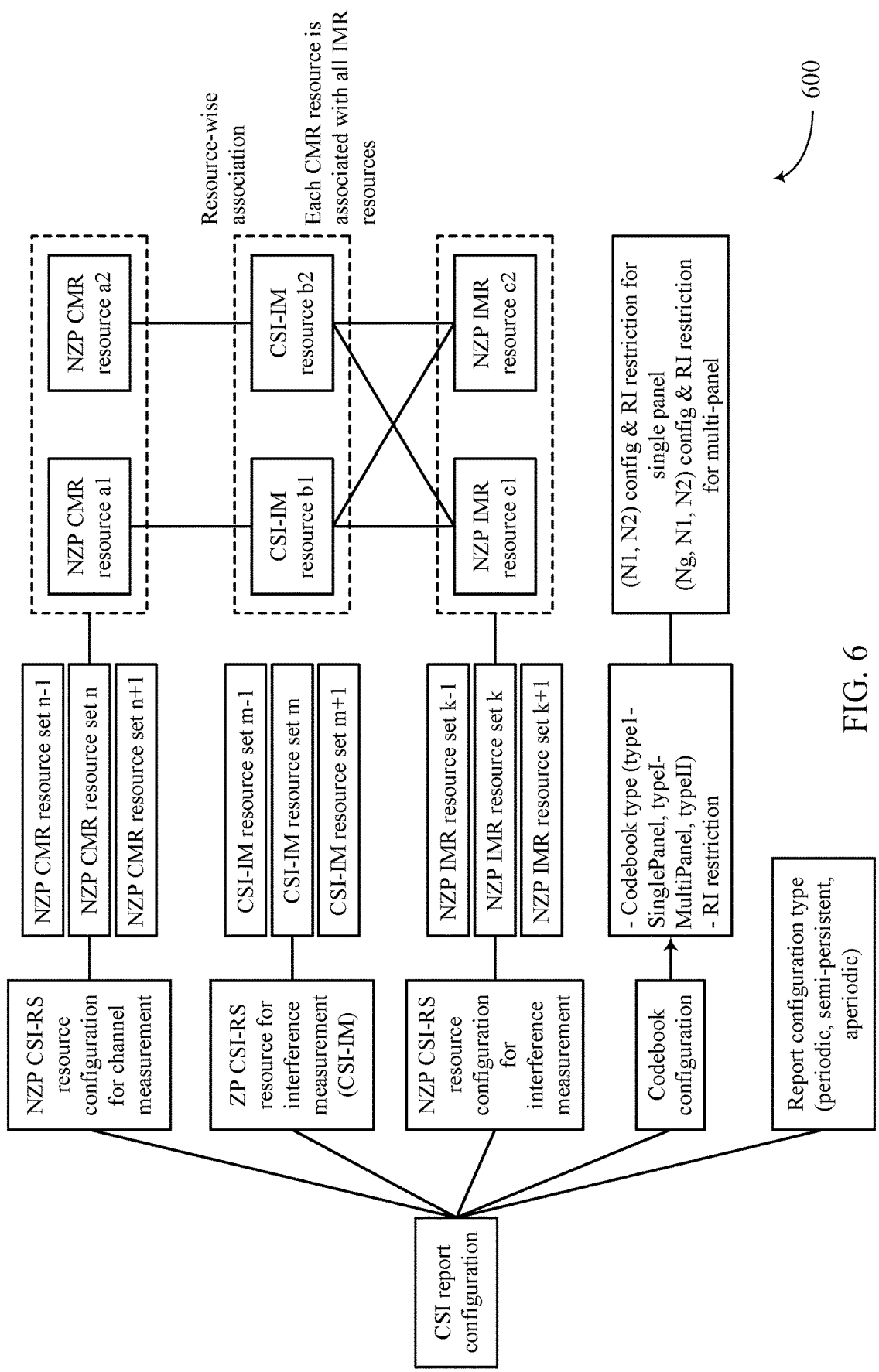
FIG. 6 illustrates an example of a channel state information (CSI) report configuration in accordance with one or more aspects of the present disclosure.

FIG. 6 illustrates an example of a CSI report configuration 600 in accordance with one or more aspects of the present disclosure. The CSI report configuration 600 may include a non-zero power (NZP) CSI-RS resource configuration for channel measurements (e.g., on a channel measurement resource (CMR)). The NZP CSI-RS resource configuration for channel measurements may indicate at least one resource set (e.g., NZP CMR resource set), and the resource set may include resources on which the UE 115 may perform CMR. The CSI report configuration 600 may also include a zero-power (ZP) CSI-RS resource configuration for interference measurements (IM) (e.g., on an IM resource (IMR)). The ZP CSI-RS resource configuration for CSI-IM may indicate at least one resource set, and the resource set may include resources for the UE 115 to perform CSI-IM. The CSI report configuration 600 may also include an NZP CSI-RS resource configuration for IM. The NZP CSI-RS resource configuration for CSI-IM may indicate at least one resource set, and the resource set may include resources for the UE 115 to perform CSI-IM. The CSI report configuration 600 may also include a codebook configuration indicating the measurements for the UE 115 to report (e.g., a channel quality indicator (CQI), rank indicator (RI), etc.), and the CSI report configuration 600 may include a report configuration type indicating whether the UE 115 is to report CSI periodically, semi-persistently, or aperiodically.

Figure 7:
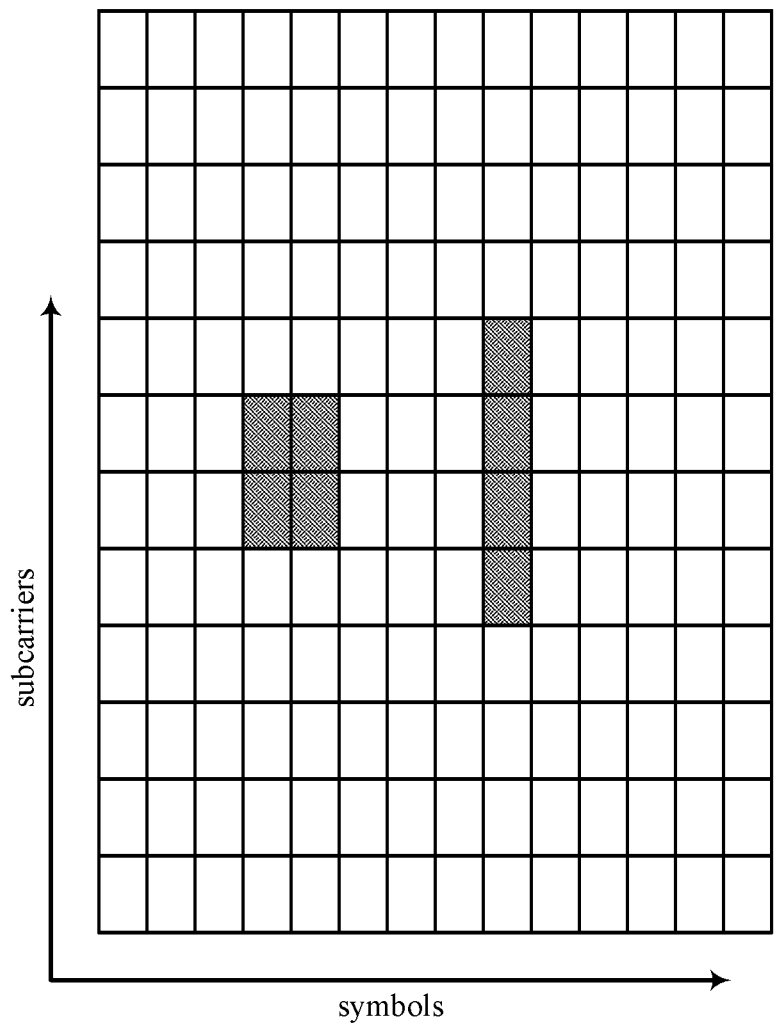
FIG. 7 illustrates an example of a CSI interference measurement (CSI-IM) configuration in accordance with one or more aspects of the present disclosure.

FIG. 7 illustrates an example of a CSI-IM configuration 700 in accordance with one or more aspects of the present disclosure. CSI-IM resources may be configured for the purposes of interference measurements to enable accurate CSI reporting reflecting inter-cell interference. Multiple patterns for CSI-IM resources may be supported. A first pattern (e.g., pattern 0) may consist of two contiguous resource elements in two contiguous symbols. A second pattern (e.g., pattern 1) may consist of four contiguous resource elements in one symbol. The size of CSI-IM resources in frequency may be configured by a starting resource block and a number of resource blocks. A CSI report configuration may include a CSI-IM resource set for interference measurement. The configured resources may be used by a UE 115 to measure interference.

As described, a UE 115 in wireless communications system 100 may also be configured with resources for channel measurements. The UE 115 may receive CSI-RSs from a network entity 105 (e.g., with which the UE 115 is connected), and the UE 115 may perform the channel measurements on the CSI-RSs. In some cases, the UE 115 may be configured to report reference signal received power (RSRP) measurements on the CSI-RSs. For RSRP reporting, the UE 115 may report a number of reported reference signals (e.g., 1, 2, 3, or 4 in accordance with a higher layer configuration) and different CSI-RS resource indicators (CRI) or synchronization signal block (SSB) resource indicators (SSBRIs) for each report setting. The wireless communications system 100 (e.g., an NR system) may categorize a CSI report setting into wideband and subband frequency granularities. Beam reporting may be classified as wideband frequency granularity CSI.

In some cases, whether for reporting channel measurements, interference measurements, or both, a UE 115 may be configured with suitable resources for reporting CSI. In particular, the resources configured for reporting CSI may provide enough time for the UE 115 to perform the CSI measurements, generate a CSI report, and transmit the CSI report. In some examples, the resources used for reporting CSI may be determined based on a CSI reference resource. For instance, some CSI parameters (e.g., CQI) may be calculated assuming a hypothetical PDSCH transmission scheduled in a CSI reference resource. The CSI reference resource may define a set of properties for this hypothetical PDSCH transmission (e.g., a reference signal overhead, bandwidth, precoding, etc.). The CSI reference resource may define a downlink slot as a timing reference for determining an end of a measurement window (e.g., in which to perform CSI measurements). After the CSI reference resource (e.g., reference slot), no subsequent channel and interference measurements may be included in a CSI report.

In some examples, the CSI reference resource in a time domain for a CSI report in an uplink slot n' may be defined by a single downlink slot $n-n_{CSI,ref}$. For periodic and semi-persistent CSI reporting, if a single CSI-RS or SSB resource is configured for channel measurement, $n-n_{CSI,ref}$ may be the smallest value greater than or equal to $4 \cdot 2^{\mu_{DL}}$, such that the CSI reference resource corresponds to a valid downlink slot, where µ refers to a subcarrier spacing (SCS). Further, for periodic and semi-persistent CSI reporting, if multiple CSI-RS or SSB resources are configured for channel measurement, $n-n_{CSI,ref}$ is the smallest value greater than or equal to $5 \cdot 2^{\mu_{DL}}$, such that the CSI reference resource corresponds to a valid downlink slot. Once a UE 115 performs the CSI measurements in a measurement window based on the CSI reference resource, the UE 115 may transmit the CSI report in an uplink control information (UCI) payload. The UCI may be sent on PUCCH or PUSCH which may consist of one part or two parts depending on a reporting quantity and type (e.g., wideband vs subband reporting). A payload size of CSI part 1 may be fixed (e.g., use zero padding), and a payload size for CSI part 2 may be derived from information in the CSI part 1.

Figure 8:
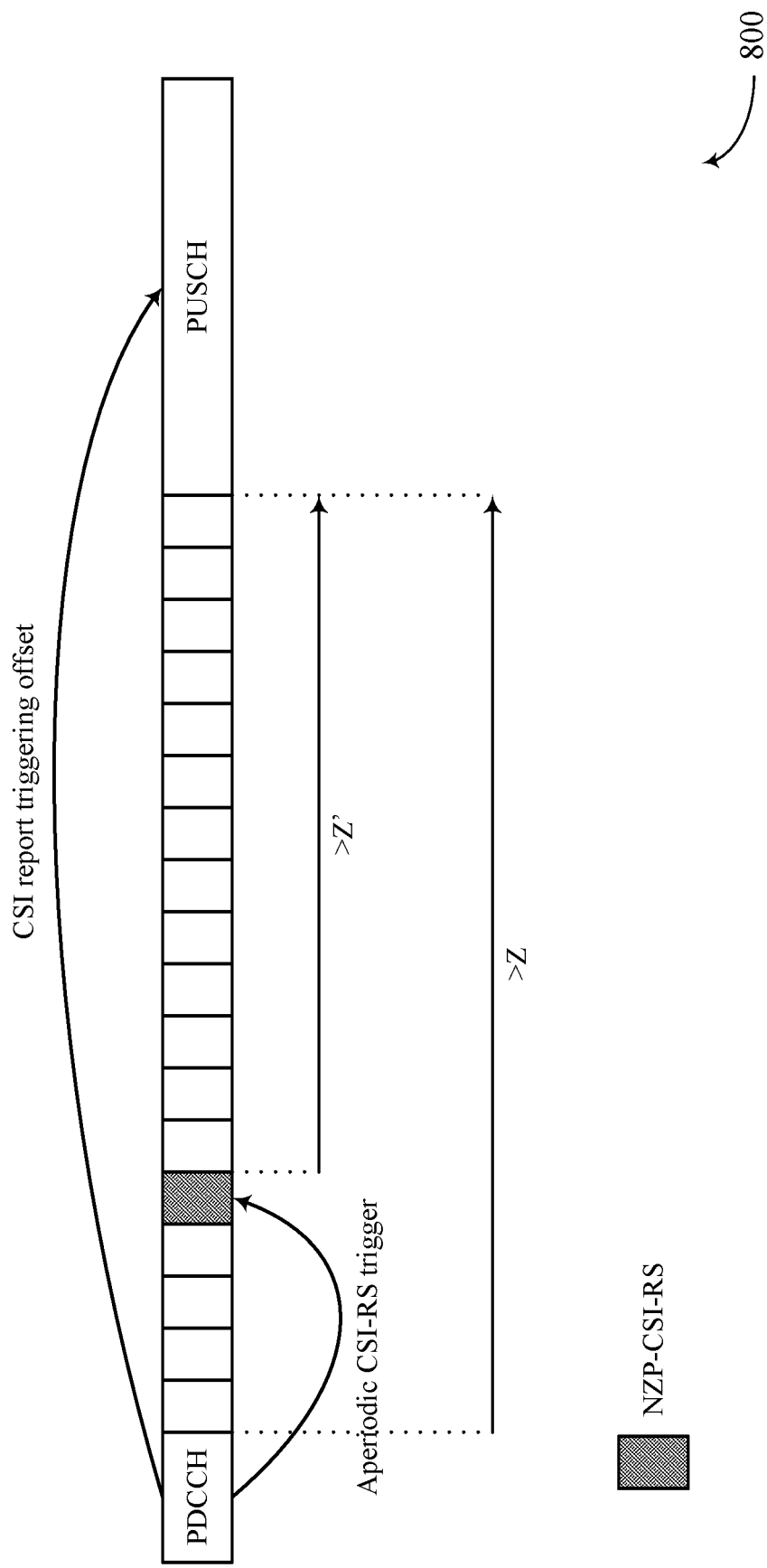
FIG. 8 illustrates an example of timing for CSI reporting in accordance with one or more aspects of the present disclosure.

FIG. 8 illustrates an example of timing for CSI reporting 800 in accordance with one or more aspects of the present disclosure. The wireless communications system 100 may specify timing requirements for CSI processing to guarantee that a UE 115 has enough time to generate a CSI report. In some cases, the UE 115 may support ultra-low latency reporting for some special cases (e.g., defined in a CSI computation delay requirement 1). In other cases, there may be three latency classes (e.g., requirement 2): a low-latency class (Z1), a high latency class (Z2), and a latency class for beam reporting (Z3). An Xi value for CSI reporting may depend on a reported UE capability. Further, a latency class for CSI reporting may assign values for Z and Z' as illustrated in FIG. 8. The Z value may be a quantity of symbols and may correspond to a time for processing control information in a PDCCH to determine to perform CSI measurements and a time to perform and report the CSI measurements. The Z' value may also be a quantity of symbols and may correspond to a time to perform and report the CSI measurements. Thus, a UE 115 may be configured with a duration greater than or equal to Z for processing the control information, performing CSI measurements, and reporting the CSI measurements, and the UE 115 may be configured with a duration greater than or equal to Z' for performing the CSI measurements and reporting the CSI measurements.

In addition to minimizing CLI from a network entity 105 to communications at a UE 115, it may be appropriate to minimize CLI from other UEs 115 to communications at the UE 115. For instance, it may be appropriate to support techniques for handling or managing inter-network entity and inter-UE CLI handling. If the UE 115 is operating in a half-duplex mode and a network entity 105 is operating in an SBFD or IBFD mode, there may be one or more sources of interference at the UE 115. For instance, the UE 115 may experience inter-cell interference from other network entities 105, intra-cell CLI interference from UEs 115 in a same cell, or inter-cell CLI from UEs in adjacent cells. In addition, full-duplex UEs 115 may experience self-interference.

Figure 9:
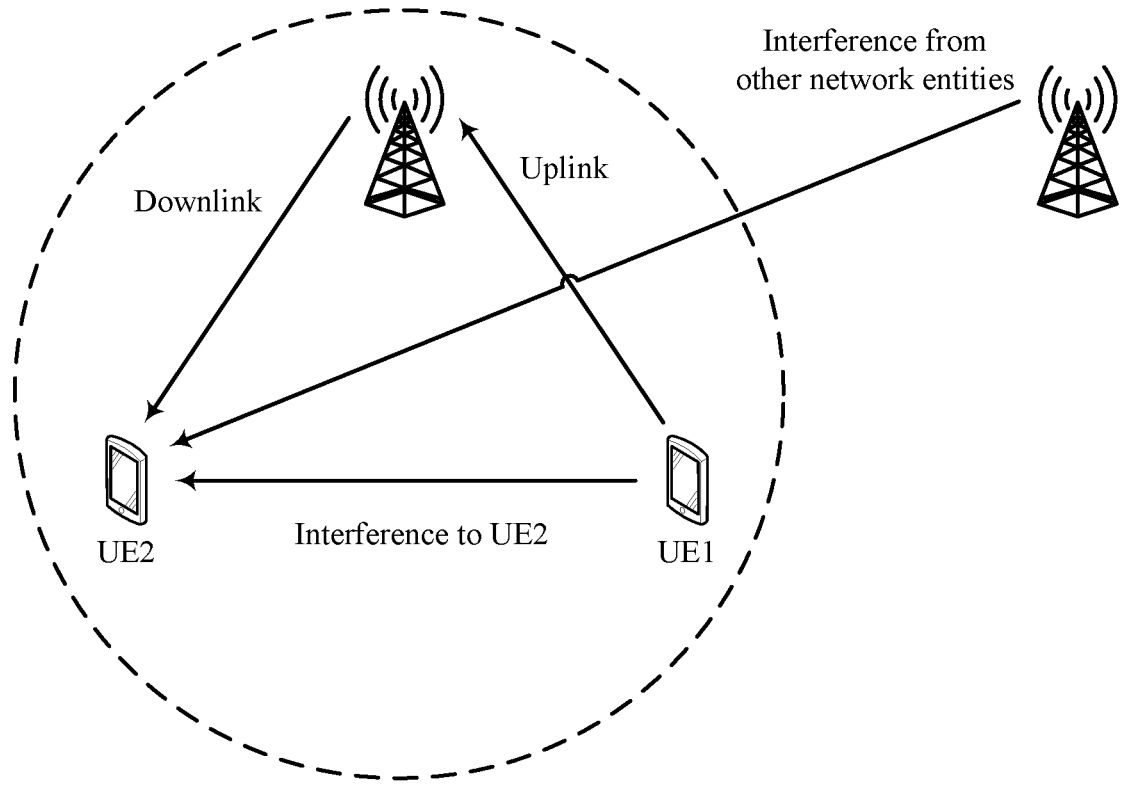
FIG. 9 illustrates an example of interference from other network entities on communications at a UE and interference from another UE on communications at the UE in accordance with one or more aspects of the present disclosure.

FIG. 9 illustrates an example of interference 900 from other network entities on communications at a UE 115 and interference 900 from another UE 115 on communications at the UE 115 in accordance with one or more aspects of the present disclosure.

Figure 10:
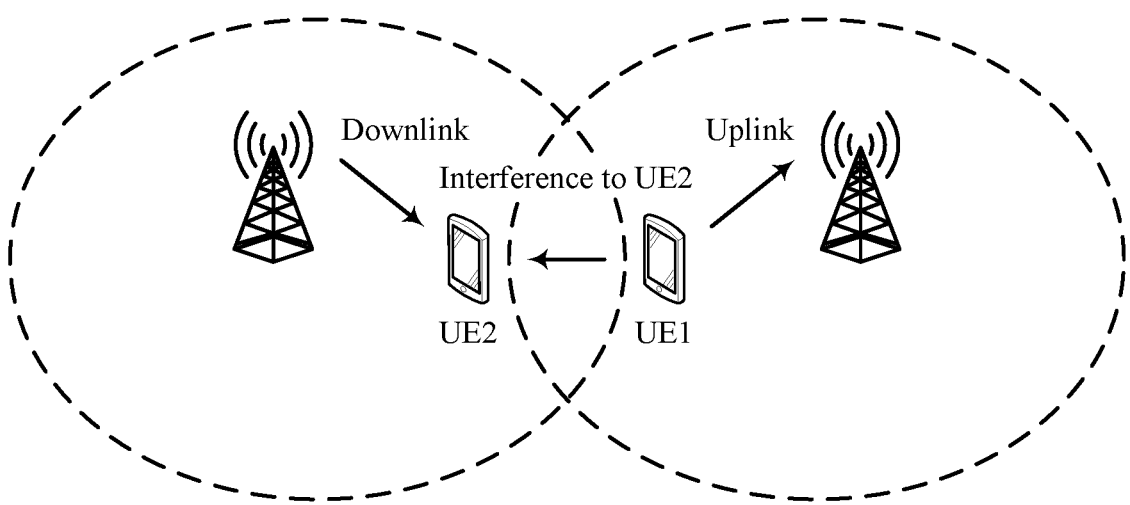
FIG. 10 illustrates an example of inter-cell interference at a UE, including interference at one UE in one cell from another UE in another cell, in accordance with one or more aspects of the present disclosure.

FIG. 10 illustrates an example of inter-cell interference 1000 at a UE 115, including interference at one UE 115 in one cell from another UE 115 in another cell, in accordance with one or more aspects of the present disclosure.

Figure 11:
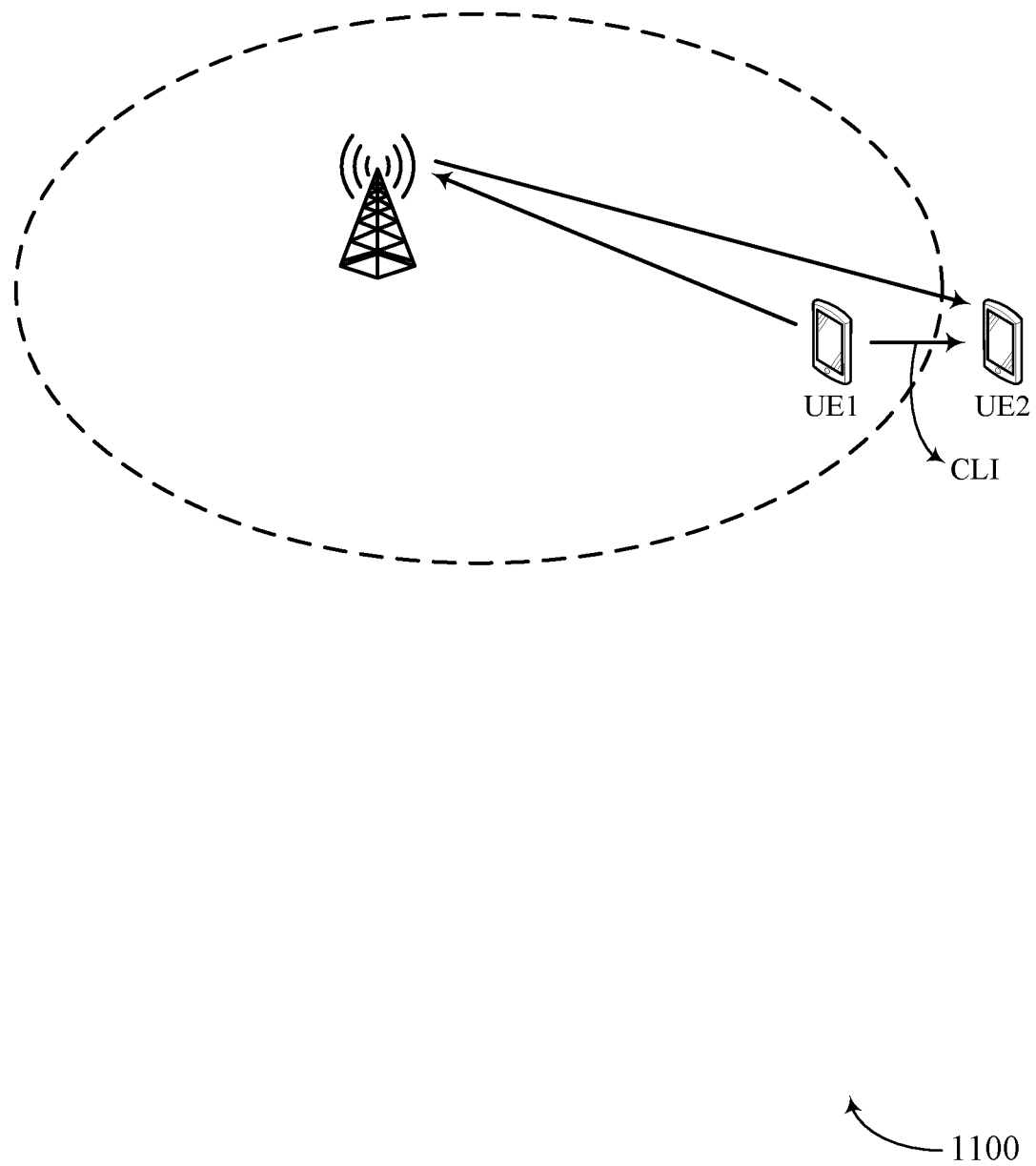
FIG. 11 illustrates an example of intra-cell CLI in sub-band full duplex (SBFD) or in-band full duplex (IBFD) in accordance with one or more aspects of the present disclosure.

FIG. 11 illustrates an example of intra-cell CLI 1100 in SBFD or IBFD in accordance with one or more aspects of the present disclosure. In SBFD, a network entity 105 may configure a downlink transmission to a UE 115 on frequency domain resources adjacent to the frequency domain resources configured for an uplink transmission from another UE 115. In an example SBFD scenario, a first UE 115 may transmit an uplink transmission in the middle of a band, and a second UE 115 may receive a downlink transmission from a network entity 105 on adjacent frequency resources. The uplink transmission of the first UE 115 may cause CLI to downlink reception at the second UE 115. The CLI may be due to energy leakage caused by timing and frequency unalignment between the first and second UEs 115 or due to an automatic gain control (AGC) mismatch (e.g., if an AGC at the second UE 115 is driven by a downlink serving cell signal of the second UE 115 but the CLI from the first UE 115 is strong enough to saturate the AGC at the second UE 115).

Figure 12:
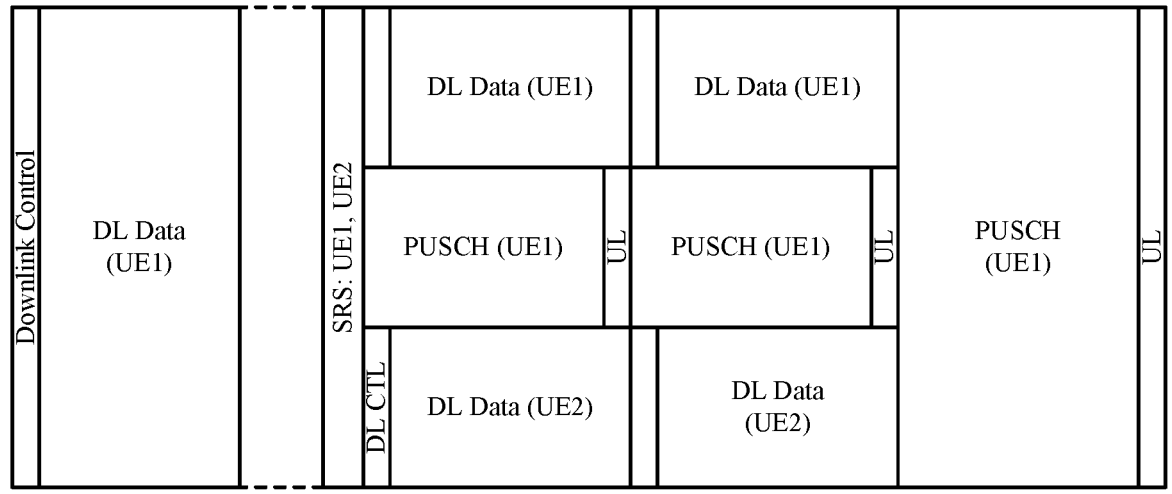
FIG. 12 illustrates an example of an SBFD slot format in accordance with one or more aspects of the present disclosure.

FIG. 12 illustrates an example of an SBFD slot format 1200 in accordance with one or more aspects of the present disclosure. The SBFD slot format may be defined as a 'D+U' slot, which may be a slot in which a band is used for both uplink and downlink transmissions. The downlink and uplink transmissions may occur in overlapping bands (e.g., IBFD) or adjacent bands (e.g., SBFD). In a given 'D+U' symbol, a half-duplex UE 115 either transmits in an uplink band or receives in a downlink band. In a given 'D+U' symbol, a full-duplex UE 115 can transmit in an uplink band and/or receive in a downlink band in a same slot. A 'D+U' slot may contain only downlink symbols, only uplink symbols, or full-duplex symbols.

The wireless communications system 100 may support techniques for mitigating or minimizing inter-UE CLI. A first UE 115 may be configured to receive SRSs from a second UE 115, and the first UE 115 may report CLI measurements performed on the SRSs to a network entity. An SRS may refer to an uplink reference signal transmitted by the second UE 115.

Figure 13:
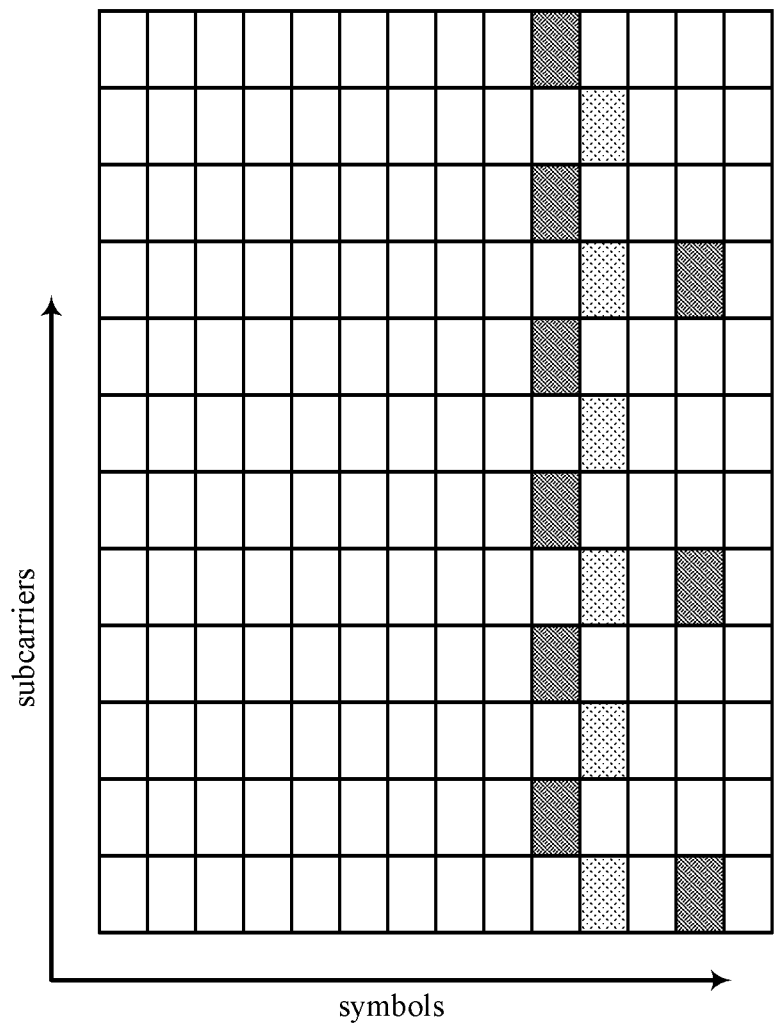
FIG. 13 illustrates an example of a sounding reference signal (SRS) configuration in accordance with one or more aspects of the present disclosure.

FIG. 13 illustrates an example of an SRS configuration 1300 in accordance with one or more aspects of the present disclosure. The SRS configuration may indicate a mapping of SRSs to physical resources in a resource block. In time, in some examples, SRSs may span up to four symbols and may be configured in the last six symbols in a slot. In other examples, SRSs may span one or more symbols and may be configured in different symbols in a slot. In frequency, SRSs may be transmitted in a comb-like pattern (e.g., a comb-2 SRS pattern including SRSs mapped to every other subcarrier, and a comb-4 SRS pattern including SRSs mapped to every fourth subcarrier) and may be configured with a comb offset. The SRS configuration may further indicate a time and frequency configuration for SRSs. The time and frequency configuration may indicate whether the second UE 115 is to transmit periodic, aperiodic, or semi-persistent SRS. The time and frequency configuration may also indicate a periodicity and slot offset, a sounding bandwidth in a BWP, and a frequency hopping pattern for SRS transmissions.

The techniques described herein provide for efficiently performing CLI measurements and reporting based on the CLI measurements to facilitate techniques at a network entity 105 or a UE 115 for minimizing CLI. In one aspect, a UE 115 may report CSF to a network entity 105 based on CSI measurements and CLI measurements. In another aspect, a UE 115 may explicitly report CLI measurements to a network entity 105. The report of the CLI measurements may include a first set of fields including indicators for the CLI measurements and a second set of fields including the CLI measurement values. In yet another aspect, a UE 115 may report SINR to a network entity 105 based on CLI measurements, and the network entity 105 may trigger the UE 115 to perform further CLI measurements on signals received from other UEs based on the SINR. In yet another aspect, a UE 115 may generate a report using CLI measurements based on whether the UE 115 is allocated enough time to generate and transmit the report. For instance, the content of the CLI report may differ based on whether the UE 115 is allocated enough time to generate and transmit the report. In yet another aspect, a UE 115 may identify a suitable priority for reporting CLI to a network entity 105.

Figure 14:
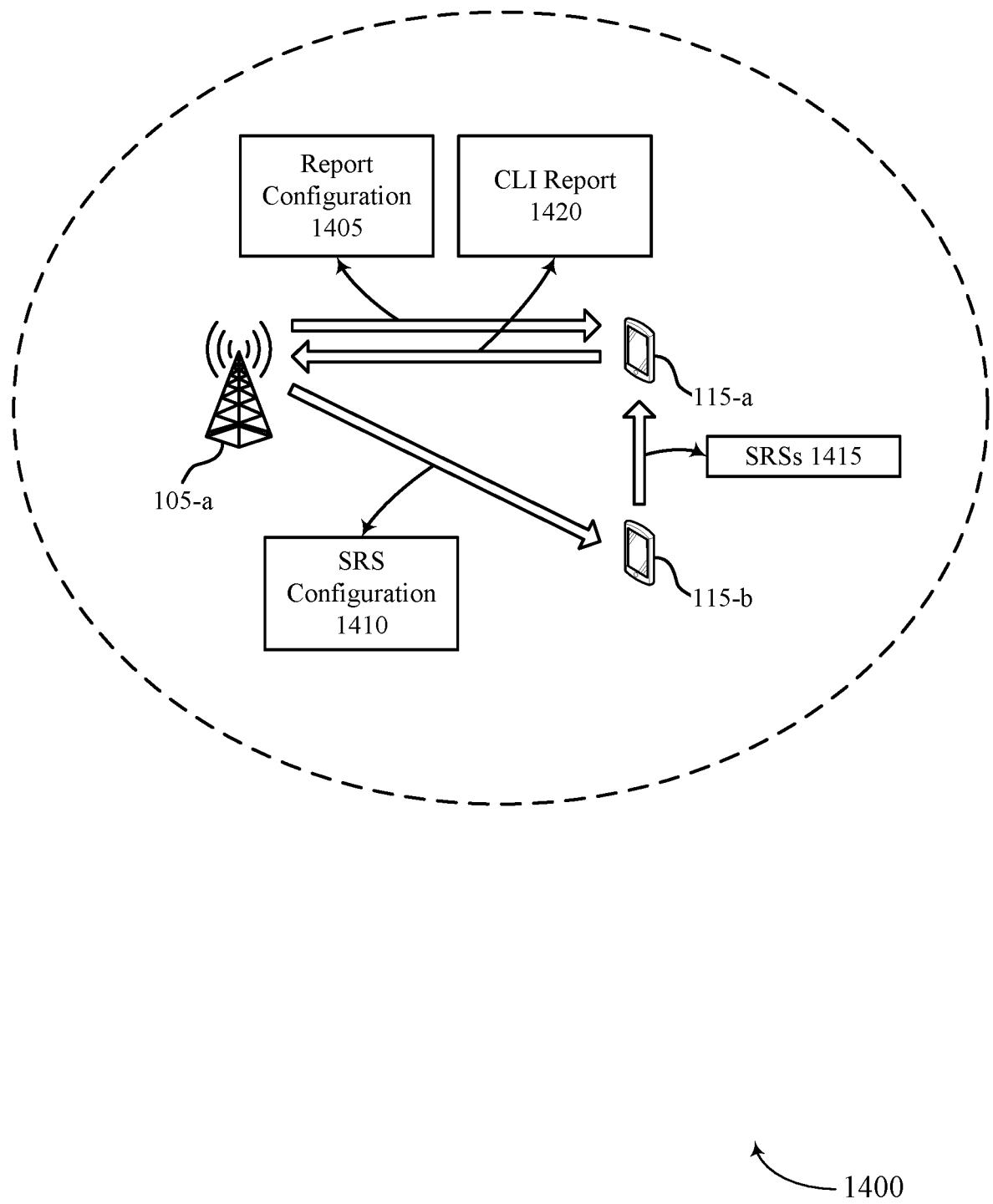
FIG. 14 illustrates an example of a wireless communications system that supports CLI reporting configuration and payload design in accordance with one or more aspects of the present disclosure.

FIG. 14 illustrates an example of a wireless communications system 1400 that supports CLI reporting configuration and payload design in accordance with one or more aspects of the present disclosure. The wireless communications system 1400 includes a network entity 105-a, which may be an example of a network entity 105 in accordance with aspects of the present disclosure. The wireless communications system 1400 also includes a UE 115-a and a UE 115-b, which may be examples of UEs 115 in accordance with aspects of the present disclosure. The wireless communications system 1400 may implement aspects of the wireless communications system 100. For instance, the wireless communications system 1400 may support efficient techniques for performing and reporting CLI measurements to minimize CLI (e.g., inter-UE CLI measurement and mitigation).

The UE 115-a may report CLI on a PUSCH or PUCCH (e.g., in a layer one (L1) CLI framework). In one aspect, the described techniques provide for supporting different options for a CLI report configuration, characteristics of a CLI report payload, and using CLI-SINR to determine the contributions of known and unknown CLI sources. The different options for the CLI report configuration may consider CLI reporting as a special case of CSI reporting, reporting explicit CLI (e.g., a received signal strength indicator (RSSI), RSRP, etc.), or reporting CSF based on CLI measurements (e.g., CSF taking CLI into account). In another aspect, the described techniques provide for establishing central processing unit (CPU) and timing requirements for CLI reports, rules for defining reference resources for CLI reports, and priority rules for CLI reporting.

In FIG. 14, the network entity 105-a may transmit a report configuration 1405 to the UE 115-a configuring the UE 115-a to report CLI measurements to the network entity 105-a or report based on CLI measurements to the network entity 105-a. The network entity 105-a may also transmit an SRS configuration 1410 to the UE 115-b configuring the UE 115-b to transmit SRSs 1415 to the UE 115-a, and the UE 115-b may transmit the SRSs 1415 to the UE 115-a based on the SRS configuration 1410. The UE 115-a may receive the SRSs 1415, perform CLI measurements on the SRSs 1415, and transmit a CLI report 1420 to the network entity 105-a based on the CLI measurements performed on the SRSs 1415. As mentioned, to capture the impact of CLI, the UE 115-a may be configured to report explicit CLI (e.g., explicit CLI measurements, such as RSRP or CLI-RSSI) or CSF based on CLI measurements.

Figure 15:
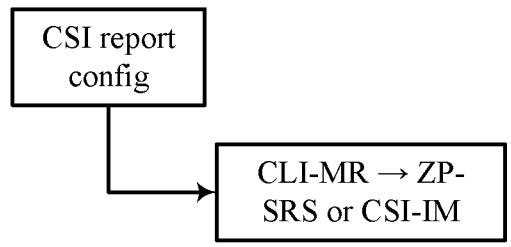
FIG. 15 illustrates an example of CLI report configurations in accordance with one or more aspects of the present disclosure.
Figure 15:
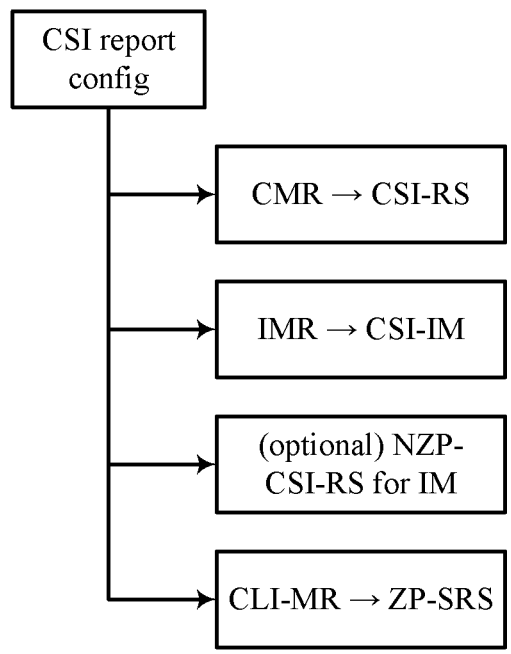

FIG. 15 illustrates examples of CLI report configurations 1500 in accordance with one or more aspects of the present disclosure. A first CLI configuration 1500-a may be used to configure the UE 115-a to report explicit CLI, and a second CLI configuration 1500-b may be used to configure the UE 115-a to report CSF based on CLI measurements. Thus, the CLI report 1420 may be a report carrying explicit CLI or may be a CSI report based on CLI measurements.

If the UE 115-a is to report explicit CLI, the wireless communications system 1400 may define a CLI report payload, a priority, CPU requirements, and timing requirements for the CLI reporting. The explicit CLI may be referred to as a special type of CSI reporting, and a report quantity field in the report configuration 1405 may indicate that the UE 115-a is to report CLI measurements. For instance, the report configuration 1405 may indicate that the UE 115-a is to transmit a CSI report with CLI (e.g., CLI-RSRP, CLI-RSSI, CLI-SINR, etc.) based on a report quantity configured in the report configuration 1405. In some examples, the CLI report or the CSI report with CLI may be similar to beam reporting based on CSI (e.g., may use a same payload structure as a payload structure configured by a CRI-RSRP report quantity). For instance, the UE 115-a may report up to specified quantity of CLI measurements (e.g., four), and the CLI measurements may correspond to different CLI measurement resources, subbands, or receive beams quasi co-located with beams used for CLI measurements.

In some cases, a CLI report may be associated with a threshold (e.g., maximum) quantity of CLI measurements (e.g., four). In other cases, a CLI report may be associated with more than a threshold quantity of CLI measurements, but the UE 115-a may report only the threshold quantity of CLI measurements of the CLI measurements performed (e.g., only four of the CLI measurements according to preconfigured rules). For instance, the UE 115-a may perform a set of CLI measurements, and the UE 115-a may select up to the threshold quantity of CLI measurements to report from the set of CLI measurements. The UE 115-a may report up to the threshold quantity of CLI measurements including the worst-case CLI measurements (e.g., report four worst-case (highest) CLI measurements). Additionally, or alternatively, the UE 115-a may report up to the threshold quantity of CLI measurements including the worst-case CLI measurements per subband for different beams used for CLI measurements (e.g., beams quasi co-located with beams indicated for the CLI measurements).

Instead of including a CRI field in the CLI report, the UE 115-a may indicate a CLI resource on which a CLI measurement (e.g., CLI value) is performed, a subband indicator indicating which subband corresponds to a CLI measurement, or a quasi co-location (QCL) indicator indicating which receive beam is used for performing a CLI measurement. For a frequency range 1 (FR1), if a CLI measurement is based on an aggressor codebook-based PUSCH (e.g., PUSCH transmissions from the UE 115-b), the UE 115-a (e.g., a victim UE 115) may try different combiners and may report a worst-case CLI or report which transmit precoding matrix indicator (TPMI) is to be avoided by the UE 115-b (e.g., in which case the UE 115-a may be able to identify which ports are being used at the UE 115-b). Table 1 illustrates an example of a mapping order of CLI fields of one report for CLI reporting.

TABLE 1

Mapping order of CLI fields of one report for CLI reporting

| CLI report number | CLI fields |
|---|---|
| CLI report #n | CLI resource indicator, subband indicator, QCL indicator #1<br>CLI resource indicator, subband indicator, QCL indicator #2<br>CLI resource indicator, subband indicator, QCL indicator #3<br>CLI resource indicator, subband indicator, QCL indicator #4<br>RSRP #1<br>Differential RSRP #2<br>Differential RSRP #3<br>Differential RSRP #4 |

In Table 1, a first set of fields may correspond to or include one or more CLI resource indicators, subband indicators, QCL indicators, or TPMI restrictions, and a second set of fields may include CLI values (e.g., RSRP, RSSI, or SINR) for CLI measurements (e.g., four CLI measurements). For instance, a CLI resource indicator, subband indicator, or QCL indicator #1 may correspond to an RSRP #1 (e.g., may indicate a CLI resource, subband, or beam associated with the RSRP measurement). In some cases, the CLI report 1420 may be configured to include more than a threshold quantity (e.g., four) of CLI measurements. If a quantity of CLI measurements performed by the UE 115-*a* is up to the threshold quantity, then the CLI report 1420 may consist of one part. If a quantity of CLI measurements performed by the UE 115-*a* is greater than the threshold quantity, then the CLI report 1420 may consist of more than one part (e.g., two parts). For example, remaining CLI measurements may be included in a CLI part 2. The CLI part 1 may have a fixed size, and the CLI part 1 may include CLI measurements up to the fixed size, with the remaining CLI measurements included in CLI part 2.

If the UE 115-*a* is to report CSF based on CLI measurements, the UE 115-*a* may be configured with NZP-CSI-RSs for channel measurements and other CSI-RSs for interference measurements. For instance, the UE 115-*a* may be configured with CSI-RSs for interference measurements for inter-cell interference (e.g., CSI-IM) and CSI-RSs or ZP-SRSs for interference measurements for inter-UE interference or CLI (e.g., CSI-IM or ZP-SRS). The UE 115-*a* may also be configured with NZP-CSI-RSs for measuring downlink spatial division multiplexing (DL-SDM) interference. After performing the CSI interference measurements and the CLI measurements, the UE 115-*a* may report CSF taking into account an impact of CLI or CLI measurements. In such cases, the CLI report 1420 may be a CSI report which may include a CSF payload and may be associated with the same priority, CPU requirements, or timing requirements associated with any CSI report (e.g., a CSI report independent of CLI measurements).

If the UE 115-*a* is capable of reporting explicit CLI and reporting CSF based on CLI measurements, the UE 115-*a* may determine whether to report the explicit CLI or report CSF based on CLI measurements based on a CSI report quantity (e.g., flag or metric) included in the report configuration 1405. If the UE 115-*a* or the CLI report 1420 is configured with a CLI measurement resource, and a CSI report quantity fails to indicate explicit CLI reporting (e.g., indicates a CSI report quantity), then the UE 115-*a* may report CSF based on CLI measurements. Additionally, or alternatively, the UE 115-*a* may determine whether to report the explicit CLI or report CSF based on CLI measurements based on a dedicated CLI framework for explicit CLI reporting. For instance, if the UE 115-*a* receives the second CLI configuration 1500-*b*, the UE 115-*a* may report explicit CLI. Otherwise, the UE 115-*a* may report the CSF based on CLI measurements.

In some aspects, a CLI framework in wireless communications system 1400 may support RSSI-CLI and RSRP-CLI measurements. In some cases, it may be appropriate for the UE 115-*a* to report CLI-SINR measurements to the network entity 105-*a*. The signals measured by the UE 115-*a* may correspond to one or more NZP-CLI-SRSs to be measured. Reference signals (e.g., CLI-SRSs) transmitted by the UE 115-*b* (e.g., aggressors) may be known or distinguishable by the UE 115-*a*, and the UE 115-*a* may descramble the signals and measure the RSRP of the signals. However, interference at the UE 115-*a* may also come from all other interfering signals which may include uplink transmissions from unknown aggressors (e.g., intra-cell or inter-cell CLI) and/or interference from a neighboring cell. Therefore, CLI-SINR may capture a ratio of known CLI to unknown interference plus noise. For instance, the UE 115-*a* may then use the RSRP and a measured RSSI to determine the CLI-SINR (e.g., subtract the RSRP from the RSSI).

In wireless communications system 1400, the network entity 105-*a* may configure the UE 115-*a* (e.g., a victim UE 115) to measure and report CLI-SINR, where the CLI-SINR may be based on one or more CLI-SRS resources from one or more known aggressor UEs 115. The network entity 105-*a* may use the CLI-SINR report to figure out an impact of unknown interference at the UE 115-*a*. The network entity 105-*a* may then trigger additional CLI measurements at the UE 115-*a* from other potential intra-cell aggressor UEs 115 (e.g., if the unknown interference at the UE 115-*a* is high or satisfies an interference threshold). In some examples, unknown interference at a cell-edge UE 115 may indicate the existence of inter-cell CLI.

Figure 16:
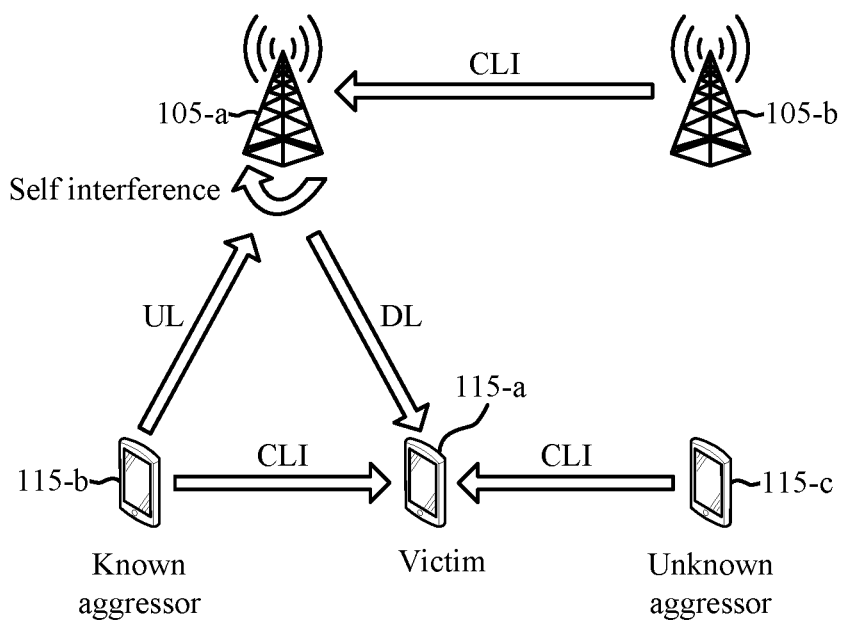
FIG. 16 illustrates an example of CLI from an unknown aggressor in accordance with one or more aspects of the present disclosure.

FIG. 16 illustrates an example of CLI 1600 from an unknown aggressor in accordance with one or more aspects of the present disclosure. The UE 115-*a* may be configured to report CLI-SINR to identify the different interference contributions (e.g., intra-cell CLI, inter-cell CLI, or interference from a neighbor cell). The network entity 105-*a* may configure the UE 115-*a* (e.g., a victim UE 115) to measure CLI-SINR based on one or more CLI-SRSs from a known intra-cell aggressor. For instance, the UE 115-*a* may descramble all CLI-SRSs and measure CLI-SINR to figure out an impact of the remaining interference. If the network entity 105-*a* determines that the remaining interference is high, the network entity 105-*a* may trigger a UE 115-*c* (e.g., an unknown aggressor) to transmit SRSs to the UE 115-*a*. The UE 115-*a* may then report the CLI from the UE 115-*b* and the CLI from the UE 115-*c* to the network entity 105-*a*, and the network entity 105-*a* may schedule communications at the UE 115-*a* based on the CLI from the UE 115-*b* and the CLI from the UE 115-*c*.

In addition to generating a suitable payload for the CLI report 1420 to allow the network entity 105-*a* to minimize CLI, the wireless communications system 1400 may support suitable CPU and timing requirements for CLI reporting and suitable prioritization of CLI reports. The CLI report 1420 may be assumed to occupy a single CPU similar to beam reporting (e.g., require a single processor to perform CLI measurements and generate the CLI report 1420). Further, when the UE 115-*a* is configured to report CLI, a computation delay for reporting the CLI may be based on a latency class of the UE 115-*a*. In one example, a latency class for CLI reporting may be the same as a latency class for beam reporting and may depend on a reported capability of the UE 115-*a* (e.g., Z3 defined in CSI computation delay requirements 2). In another example, a latency class for CLI reporting may be defined as a separate latency class (e.g., from beam reporting). In this example, the CLI latency class may be defined to be dependent on a reported capability of the UE 115-*a* for CLI processing, or the CLI latency class may be defined as fixed values which may be a function of SCS ($\mu$). In yet another example, a latency class for CLI reporting may be defined as either a low latency class or a high latency class and may depend on a quantity of CLI measurements to be reported, wideband vs subband CLI reporting, or whether the CLI report 1420 is based on a single CLI resource vs multiple CLI resources. In any of the examples, the UE 115-*a* may be configured to perform CLI measurements and transmit the CLI report 1420 in accordance with the latency class of the UE 115-*a* such that the UE 115-*a* has enough time to receive SRSs, perform CLI measurements on the SRSs, generate the CLI report 1420, and transmit the CLI report 1420. If the UE 115-*a* determines that there is not enough time to generate and transmit the CLI report 1420, the UE 115-a may transmit dummy values, null values, or outdated CLI measurements in the CLI report 1420. Otherwise, the UE 115-a may perform the CLI measurements on the SRSs 1415 and transmit the CLI measurements in the CLI report 1420.

In some examples, the UE 115-a may be configured with a CLI reference resource that defines a window within which the UE 115-a may perform CLI measurements for the CLI report 1420. In particular, the CLI reference resource may be a last resource within which the UE 115-a may perform CLI measurements for the CLI report 1420. In some examples, for periodic or semi-persistent CLI reporting, a time domain of a reference CLI resource may be defined according to the same rules as a CSI report (e.g., for CLI report, $n_{CLI,ref} = n_{CSI,ref}$). In other examples, for periodic or semi-persistent CLI reporting, a time domain of a reference CLI resource may be defined based on CLI measurements being associated with lower complexity compared to CSI measurements. For instance, CLI reports may be configured with a CLI reference resources corresponding to $n_{CLI,ref}$, where $n_{CLI,ref}$ can be different from $n_{CSI,ref}$. If a single resource is configured for CLI measurements, $n_{CLI,ref}$ may be the smallest value greater than or equal to $X \cdot 2^{\mu DL}$, such that the CLI reference resource corresponds to a valid downlink slot. If multiple resources are configured for CLI measurements, $n_{CLI,ref}$ may be the smallest value greater than or equal to $Y \cdot 2^{\mu DL}$, such that the CLI reference resource corresponds to a valid downlink slot.

In some aspects, if the UE 115-a is configured to report CSF based on CLI measurements, a CLI measurement resource and CSI-IM resources may be assumed to be in a same slot or the CLI measurement resource may be in a different slot from CSI-RS for CSI-IM. When the UE 115-a reports CSF based on a CLI resource, and the CLI resource is in a different slot from a CSI-IM resource, a timing requirement for reporting CSF (e.g., Z, Z', or reference resource) may correspond to a minimum time for computing the report (e.g., CLI report 1420). In some examples, the timing requirement (e.g., Z, Z', or reference resource) may be derived based on CSI resources, and CLI resources may be expected to be within a predefined time offset of the CSI resources (e.g., <X symbols). In other examples, the timing requirement may be based on a latest slot carrying reference signals for either CSI or CLI (e.g., CSI or CLI resources). For instance, for periodic or semi-persistent CSI reporting based on CLI, the UE 115-a may determine if a reference slot satisfies a minimum timing requirement based on CSI resources, CLI resources, or both. In yet other examples, different timing requirements may be considered for CSI and CLI, and an additional timing requirement may be for a CLI resource.

In addition to the techniques for identifying suitable timing for reporting CLI or reporting based on CLI, the UE 115-a may support techniques for prioritizing CSI reports and CLI reports. For instance, the wireless communications system 1400 may define a priority for a CSI report with CLI or a CSI report generated based on CLI (e.g., associated with a CLI report quantity). In one example, a CSI report with CLI may have a same priority as CSI reports not carrying L1-RSRP or L1-SINR (e.g., k=1 for CLI). For instance, CSI reports carrying L1-RSRP or L1-SINR may be assigned a priority value (e.g., k) of 0, and CSI reports not carrying L1-RSRP or L1-SINR, CSI reports based on CLI, or CLI reports may be assigned a priority value (e.g., k) of one, where a lower value of k represents a higher priority. In another example, a CSI report with CLI may have a lower priority compared to CSI reports (e.g., k=2 for CLI). In yet another example, a CSI report with CLI may have a configurable priority in RRC (e.g., configurable 'k' for CLI in an RRC configuration message).

Figure 17:
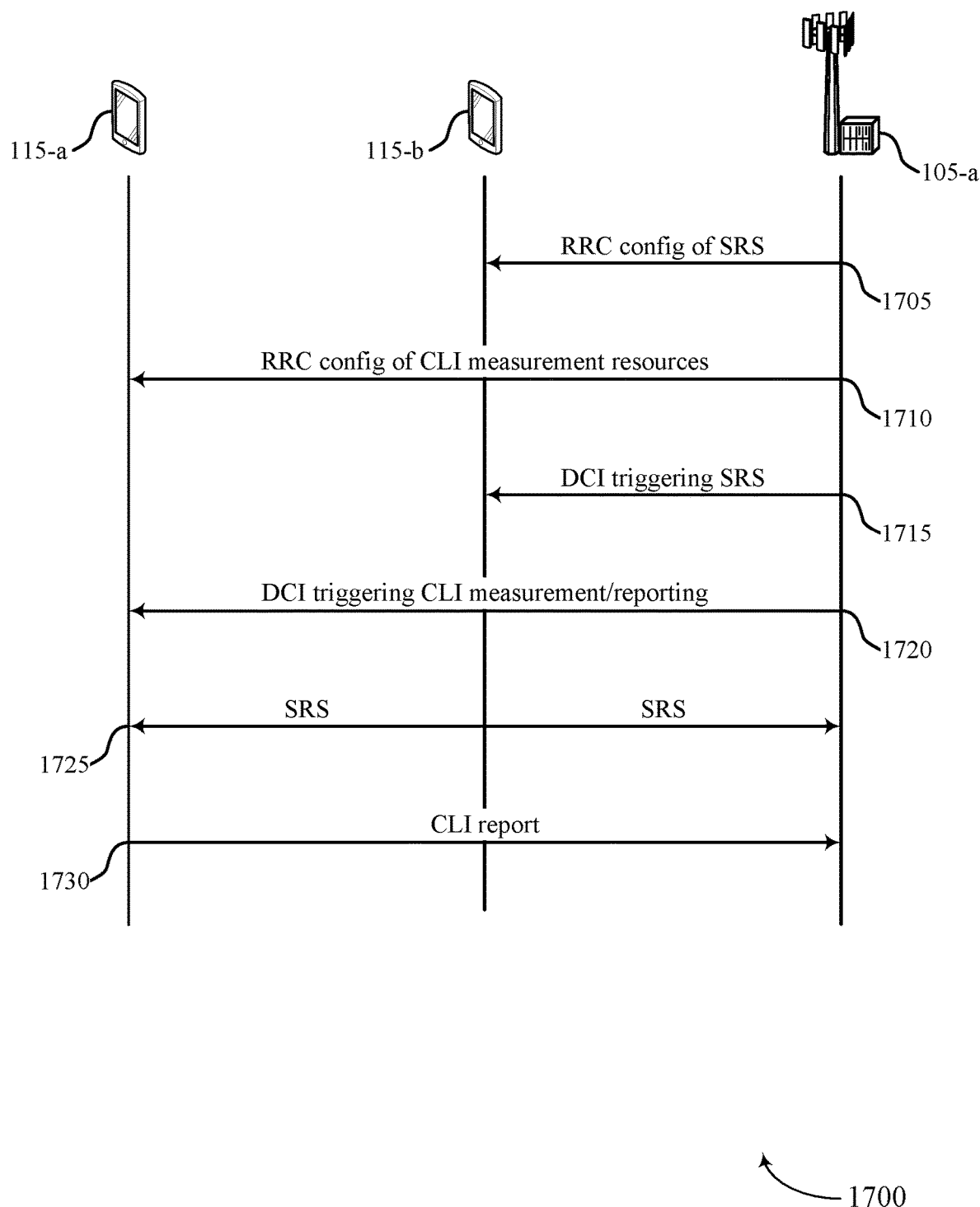
FIG. 17 illustrates an example of a process flow that supports CLI reporting configuration and payload design in accordance with one or more aspects of the present disclosure.

FIG. 17 illustrates an example of a process flow 1700 that supports CLI reporting configuration and payload design in accordance with one or more aspects of the present disclosure. The process flow 1700 includes a network entity 105-a, which may be an example of a network entity 105 described with reference to FIGS. 1-16. The process flow 1700 also includes a UE 115-a and a UE 115-b, which may be examples of UEs 115 described with reference to FIGS. 1-16. The process flow 1700 may implement aspects of the wireless communications system 100 or the wireless communications system 1400. For example, the process flow 1700 may support efficient techniques for performing and reporting CLI measurements to minimize CLI (e.g., inter-UE CLI measurement and mitigation).

In the following description of the process flow 1700, the signaling exchanged between the network entity 105-a, the UE 115-a, and the UE 115-b may be exchanged in a different order than the example order shown, or the operations performed by the network entity 105-a, the UE 115-a, and the UE 115-b may be performed in different orders or at different times. Some operations may also be omitted from the process flow 1700, and other options may be added to the process flow 1700.

The process flow 1700 may illustrate an example of CLI reporting in accordance with an L1 CLI framework. The L1 CLI framework may provide the most flexibility and may adapt to dynamic CLI. However, the L1 CLI framework may increase L1 control signaling overhead. L1 CLI measurements and reporting may be triggered by a dedicated DCI or a group-common DCI. Aggressor UEs 115 may be configured with aperiodic, semi-persistent, or periodic NZP-SRS resources (e.g., CLI transmit resources), and victim UEs 115 may be configured with aperiodic, semi-persistent, or periodic CLI measurement resources. The UE 115-a may support aperiodic, semi-persistent, or periodic CLI reporting based on a timing (e.g., timing behavior) or a CLI resource (e.g., L1 CLI reporting). The UE 115-a may support sub-band-based CLI measurements or reporting, and the UE 115-a may support beam-based CLI measurements or reporting (e.g., using beams quasi co-located for a CLI measurement resource).

At 1705, the network entity 105-a may transmit an RRC configuration of SRSs (e.g., RRC config of aperiodic, semi-persistent, or periodic NZP-SRS) configuring the UE 115-b to transmit SRSs to the UE 115-a. At 1710, the network entity 105-a may transmit an RRC configuration of CLI measurement resources (e.g., RRC config of aperiodic, semi-persistent, or periodic CLI measurement resources) for the UE 115-a to monitor for SRSs from the UE 115-b. At 1715, the network entity 105-a may transmit downlink control information (DCI) triggering the UE 115-b to transmit the SRSs (e.g., dedicated or group-common DCI triggering of NZP-SRS), and, at 1720, the network entity 105-a may transmit DCI triggering the UE 115-a to perform CLI measurements and reporting based on the SRSs (e.g., dedicated or group-common DCI triggering of CLI measurements or reporting). At 1725, the UE 115-b may then transmit the SRSs (e.g., NZP-SRS) to be received by the UE 115-a, and the UE 115-a may perform CLI measurements on the SRSs. The UE 115-a may then transmit a CLI report (e.g., L1 CLI report) to the network entity 105-a at 1730 based on the CLI measurements performed on the SRSs.

Figure 18:
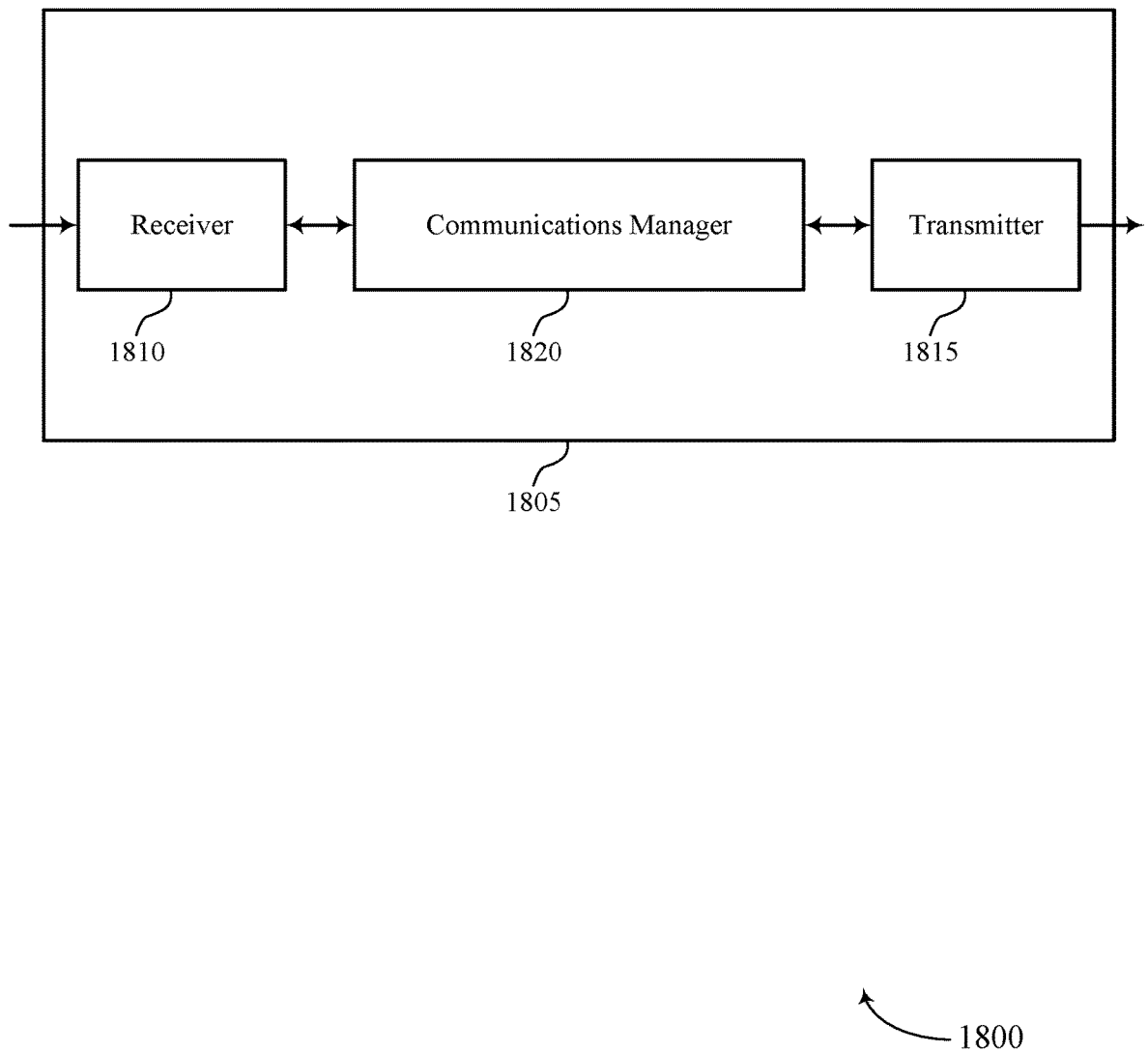
FIGS. 18 and 19 show block diagrams of devices that support CLI reporting configuration and payload design in accordance with one or more aspects of the present disclosure.

FIG. 18 shows a block diagram 1800 of a device 1805 that supports CLI reporting configuration and payload design in accordance with one or more aspects of the present disclosure. The device 1805 may be an example of aspects of a UE 115 as described herein. The device 1805 may include a receiver 1810, a transmitter 1815, and a communications manager 1820. The device 1805 may also include a processor. Each of these components may be in communication with one another (e.g., via one or more buses).

The receiver 1810 may provide a means for receiving information such as packets, user data, control information, or any combination thereof associated with various information channels (e.g., control channels, data channels, information channels related to CLI reporting configuration and payload design). Information may be passed on to other components of the device 1805. The receiver 1810 may utilize a single antenna or a set of multiple antennas.

The transmitter 1815 may provide a means for transmitting signals generated by other components of the device 1805. For example, the transmitter 1815 may transmit information such as packets, user data, control information, or any combination thereof associated with various information channels (e.g., control channels, data channels, information channels related to CLI reporting configuration and payload design). In some examples, the transmitter 1815 may be co-located with a receiver 1810 in a transceiver module. The transmitter 1815 may utilize a single antenna or a set of multiple antennas.

The communications manager 1820, the receiver 1810, the transmitter 1815, or various combinations thereof or various components thereof may be examples of means for performing various aspects of CLI reporting configuration and payload design as described herein. For example, the communications manager 1820, the receiver 1810, the transmitter 1815, or various combinations or components thereof may support a method for performing one or more of the functions described herein.

In some examples, the communications manager 1820, the receiver 1810, the transmitter 1815, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1820, the receiver 1810, the transmitter 1815, or various combinations or components thereof may be implemented in code (e.g., as communications management software or firmware) executed by a processor. If implemented in code executed by a processor, the functions of the communications manager 1820, the receiver 1810, the transmitter 1815, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1820 may be configured to perform various operations (e.g., receiving, obtaining, monitoring, outputting, transmitting) using or otherwise in cooperation with the receiver 1810, the transmitter 1815, or both. For example, the communications manager 1820 may receive information from the receiver 1810, send information to the transmitter 1815, or be integrated in combination with the receiver 1810, the transmitter 1815, or both to obtain information, output information, or perform various other operations as described herein.

The communications manager 1820 may support wireless communication at a UE in accordance with examples as disclosed herein. For example, the communications manager 1820 may be configured as or otherwise support a means for receiving first signaling indicating a first configuration including a first set of resources for channel state information measurements and a second set of resources for first cross-link interference measurements. The communications manager 1820 may be configured as or otherwise support a means for performing the channel state information measurements on the first set of resources and the first cross-link interference measurements on the second set of resources. The communications manager 1820 may be configured as or otherwise support a means for generating first channel state feedback based on the channel state information measurements and the first cross-link interference measurements. The communications manager 1820 may be configured as or otherwise support a means for reporting the first channel state feedback.

Additionally, or alternatively, the communications manager 1820 may support wireless communication at a UE in accordance with examples as disclosed herein. For example, the communications manager 1820 may be configured as or otherwise support a means for receiving sounding reference signals on a set of resources configured for cross-link interference measurements. The communications manager 1820 may be configured as or otherwise support a means for performing the cross-link interference measurements on the sounding reference signals. The communications manager 1820 may be configured as or otherwise support a means for generating a cross-link interference report including a first set of fields including indicators of at least a subset of the cross-link interference measurements and a second set of fields including the at least the subset of the cross-link interference measurements. The communications manager 1820 may be configured as or otherwise support a means for transmitting the cross-link interference report.

By including or configuring the communications manager 1820 in accordance with examples as described herein, the device 1805 (e.g., a processor controlling or otherwise coupled with the receiver 1810, the transmitter 1815, the communications manager 1820, or a combination thereof) may support techniques for reduced processing, reduced power consumption, and more efficient utilization of communication resources. In particular, because device 1805 may support efficient techniques for performing CLI and reporting based on the CLI measurements, a network entity may be able to schedule communications at the UE based on the report to minimize CLI at the device 1805. Accordingly, communications at the device 1805 may be more reliable and excessive retransmissions may be avoided, resulting in the reduced processing, the reduced power consumption, and the more efficient utilization of communication resources.

Figure 19:
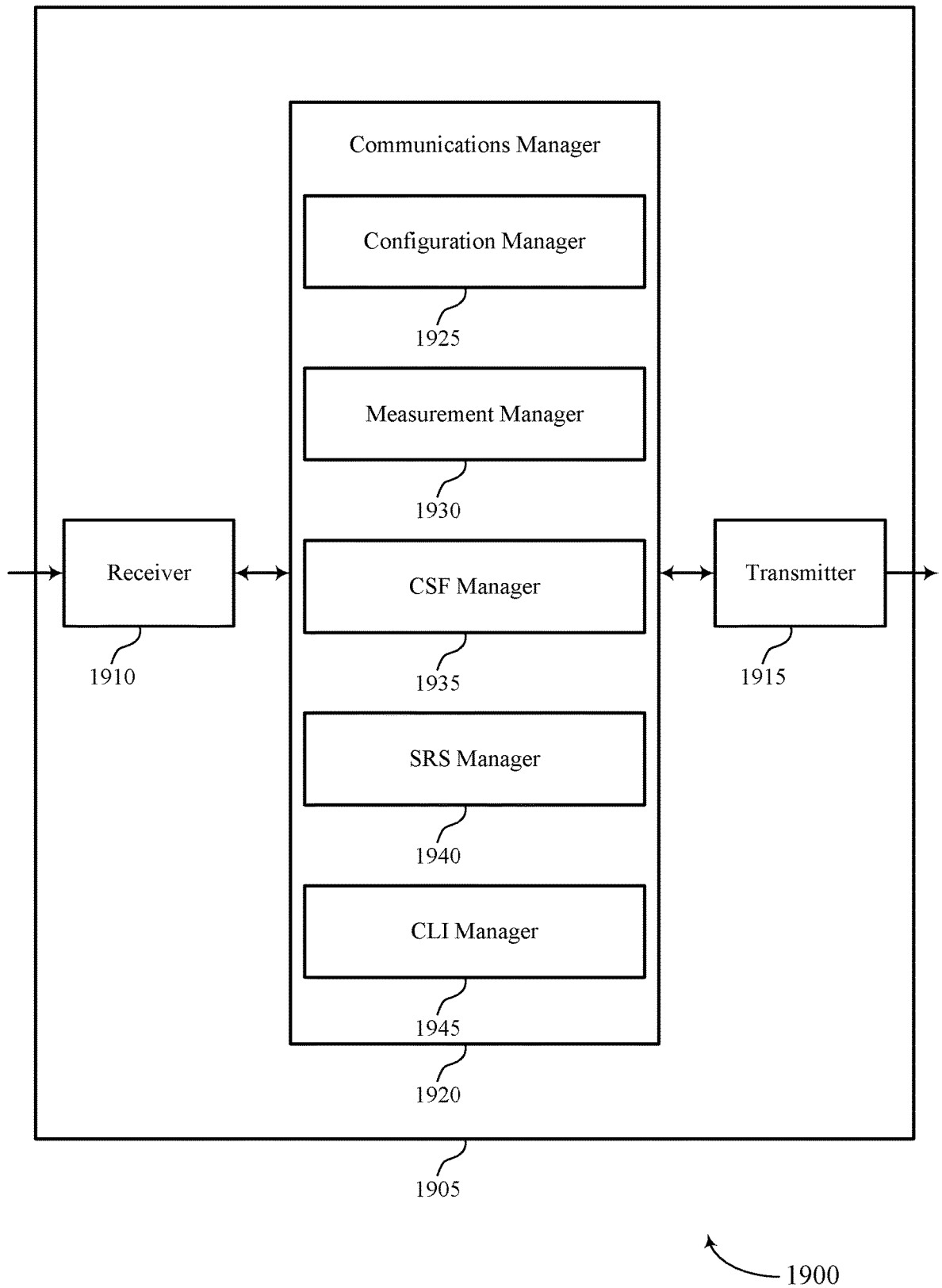

FIG. 19 shows a block diagram 1900 of a device 1905 that supports CLI reporting configuration and payload design in accordance with one or more aspects of the present disclosure. The device 1905 may be an example of aspects of a device 1805 or a UE 115 as described herein. The device 1905 may include a receiver 1910, a transmitter 1915, and a communications manager 1920. The device 1905 may also include a processor. Each of these components may be in communication with one another (e.g., via one or more buses).

The receiver 1910 may provide a means for receiving information such as packets, user data, control information, or any combination thereof associated with various information channels (e.g., control channels, data channels, information channels related to CLI reporting configuration and payload design). Information may be passed on to other components of the device 1905. The receiver 1910 may utilize a single antenna or a set of multiple antennas.

The transmitter 1915 may provide a means for transmitting signals generated by other components of the device 1905. For example, the transmitter 1915 may transmit information such as packets, user data, control information, or any combination thereof associated with various information channels (e.g., control channels, data channels, information channels related to CLI reporting configuration and payload design). In some examples, the transmitter 1915 may be co-located with a receiver 1910 in a transceiver module. The transmitter 1915 may utilize a single antenna or a set of multiple antennas.

The device 1905, or various components thereof, may be an example of means for performing various aspects of CLI reporting configuration and payload design as described herein. For example, the communications manager 1920 may include a configuration manager 1925, a measurement manager 1930, an CSF manager 1935, an SRS manager 1940, a CLI manager 1945, or any combination thereof. The communications manager 1920 may be an example of aspects of a communications manager 1820 as described herein. In some examples, the communications manager 1920, or various components thereof, may be configured to perform various operations (e.g., receiving, obtaining, monitoring, outputting, transmitting) using or otherwise in cooperation with the receiver 1910, the transmitter 1915, or both. For example, the communications manager 1920 may receive information from the receiver 1910, send information to the transmitter 1915, or be integrated in combination with the receiver 1910, the transmitter 1915, or both to obtain information, output information, or perform various other operations as described herein.

The communications manager 1920 may support wireless communication at a UE in accordance with examples as disclosed herein. The configuration manager 1925 may be configured as or otherwise support a means for receiving first signaling indicating a first configuration including a first set of resources for channel state information measurements and a second set of resources for first cross-link interference measurements. The measurement manager 1930 may be configured as or otherwise support a means for performing the channel state information measurements on the first set of resources and the first cross-link interference measurements on the second set of resources. The CSF manager 1935 may be configured as or otherwise support a means for generating first channel state feedback based on the channel state information measurements and the first cross-link interference measurements. The CSF manager 1935 may be configured as or otherwise support a means for reporting the first channel state feedback.

Additionally, or alternatively, the communications manager 1920 may support wireless communication at a UE in accordance with examples as disclosed herein. The SRS manager 1940 may be configured as or otherwise support a means for receiving sounding reference signals on a set of resources configured for cross-link interference measurements. The measurement manager 1930 may be configured as or otherwise support a means for performing the cross-link interference measurements on the sounding reference signals. The CLI manager 1945 may be configured as or otherwise support a means for generating a cross-link interference report including a first set of fields including indicators of at least a subset of the cross-link interference measurements and a second set of fields including the at least the subset of the cross-link interference measurements. The CLI manager 1945 may be configured as or otherwise support a means for transmitting the cross-link interference report.

Figure 20:
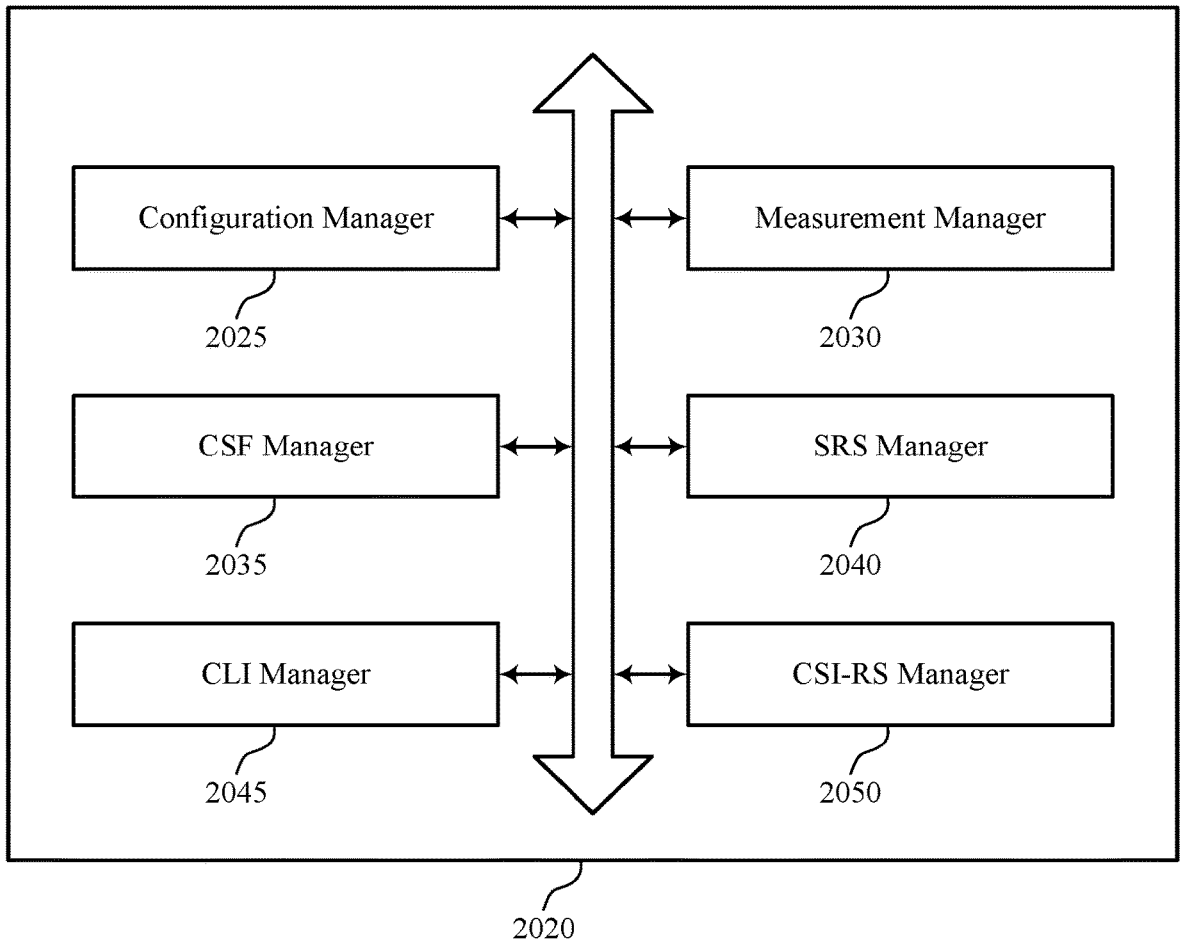
FIG. 20 shows a block diagram of a communications manager that supports CLI reporting configuration and payload design in accordance with one or more aspects of the present disclosure.

FIG. 20 shows a block diagram 2000 of a communications manager 2020 that supports CLI reporting configuration and payload design in accordance with one or more aspects of the present disclosure. The communications manager 2020 may be an example of aspects of a communications manager 1820, a communications manager 1920, or both, as described herein. The communications manager 2020, or various components thereof, may be an example of means for performing various aspects of CLI reporting configuration and payload design as described herein. For example, the communications manager 2020 may include a configuration manager 2025, a measurement manager 2030, an CSF manager 2035, an SRS manager 2040, a CLI manager 2045, a CSI-RS manager 2050, or any combination thereof. Each of these components may communicate, directly or indirectly, with one another (e.g., via one or more buses).

The communications manager 2020 may support wireless communication at a UE in accordance with examples as disclosed herein. The configuration manager 2025 may be configured as or otherwise support a means for receiving first signaling indicating a first configuration including a first set of resources for channel state information measurements and a second set of resources for first cross-link interference measurements. The measurement manager 2030 may be configured as or otherwise support a means for performing the channel state information measurements on the first set of resources and the first cross-link interference measurements on the second set of resources. The CSF manager 2035 may be configured as or otherwise support a means for generating first channel state feedback based on the channel state information measurements and the first cross-link interference measurements. In some examples, the CSF manager 2035 may be configured as or otherwise support a means for reporting the first channel state feedback.

In some examples, the CSF manager 2035 may be configured as or otherwise support a means for reporting the first channel state feedback based on the first configuration excluding a metric to trigger reporting of the first cross-link interference measurements.

In some examples, the configuration manager 2025 may be configured as or otherwise support a means for receiving second signaling indicating a second configuration including a metric to trigger reporting of second cross-link interference measurements. In some examples, the CLI manager 2045 may be configured as or otherwise support a means for reporting the second cross-link interference measurements based on the metric.

In some examples, the CSI-RS manager 2050 may be configured as or otherwise support a means for receiving channel state information reference signals on the first set of resources, where performing the channel state information measurements includes. In some examples, the measurement manager 2030 may be configured as or otherwise support a means for performing the channel state information measurements on the channel state information reference signals received on the first set of resources.

In some examples, the SRS manager 2040 may be configured as or otherwise support a means for receiving sounding reference signals on the second set of resources, where performing the first cross-link interference measurements includes. In some examples, the measurement manager 2030 may be configured as or otherwise support a means for performing the first cross-link interference measurements on the sounding reference signals received on the second set of resources.

In some examples, to support receiving the first signaling indicating the first configuration, the configuration manager 2025 may be configured as or otherwise support a means for receiving the first signaling indicating the first configuration including a third set of resources for channel state information interference measurements, the method further including. In some examples, to support receiving the first signaling indicating the first configuration, the measurement manager 2030 may be configured as or otherwise support a means for performing the channel state information interference measurements on the third set of resources, where generating the first channel state feedback is further based on the channel state information interference measurements.

Additionally, or alternatively, the communications manager 2020 may support wireless communication at a UE in accordance with examples as disclosed herein. The SRS manager 2040 may be configured as or otherwise support a means for receiving sounding reference signals on a set of resources configured for cross-link interference measurements. In some examples, the measurement manager 2030 may be configured as or otherwise support a means for performing the cross-link interference measurements on the sounding reference signals. The CLI manager 2045 may be configured as or otherwise support a means for generating a cross-link interference report including a first set of fields including indicators of at least a subset of the cross-link interference measurements and a second set of fields including the at least the subset of the cross-link interference measurements. In some examples, the CLI manager 2045 may be configured as or otherwise support a means for transmitting the cross-link interference report.

In some examples, to support performing the cross-link interference measurements, the measurement manager 2030 may be configured as or otherwise support a means for performing up to a maximum quantity of cross-link interference measurements on the sounding reference signals.

In some examples, to support performing the cross-link interference measurements, the measurement manager 2030 may be configured as or otherwise support a means for performing a set of multiple cross-link interference measurements on the sounding reference signals, where the at least the subset of the cross-link interference measurements includes up to a maximum quantity of cross-link interference measurements.

In some examples, the at least the subset of the cross-link interference measurements includes a highest set of cross-link interference measurements of the set of multiple cross-link interference measurements.

In some examples, to support performing the set of multiple cross-link interference measurements, the measurement manager 2030 may be configured as or otherwise support a means for performing the set of multiple cross-link interference measurements on each of a set of multiple subbands using a set of multiple beams, where the at least the subset of the cross-link interference measurements includes a highest cross-link interference measurement for each subband of the set of multiple subbands.

In some examples, to support generating the cross-link interference report, the CLI manager 2045 may be configured as or otherwise support a means for generating a first part of the cross-link interference report including a first subset of the cross-link interference measurements and a second part of the cross-link interference report including a second subset of the cross-link interference measurements based on a quantity of the cross-link interference measurements exceeding a threshold.

In some examples, the indicators included in the first set of fields indicate, for each cross-link interference measurement included in the cross-link interference report, a cross-link interference resource, a subband, a beam, or a combination thereof associated with the cross-link interference measurement.

Figure 21:
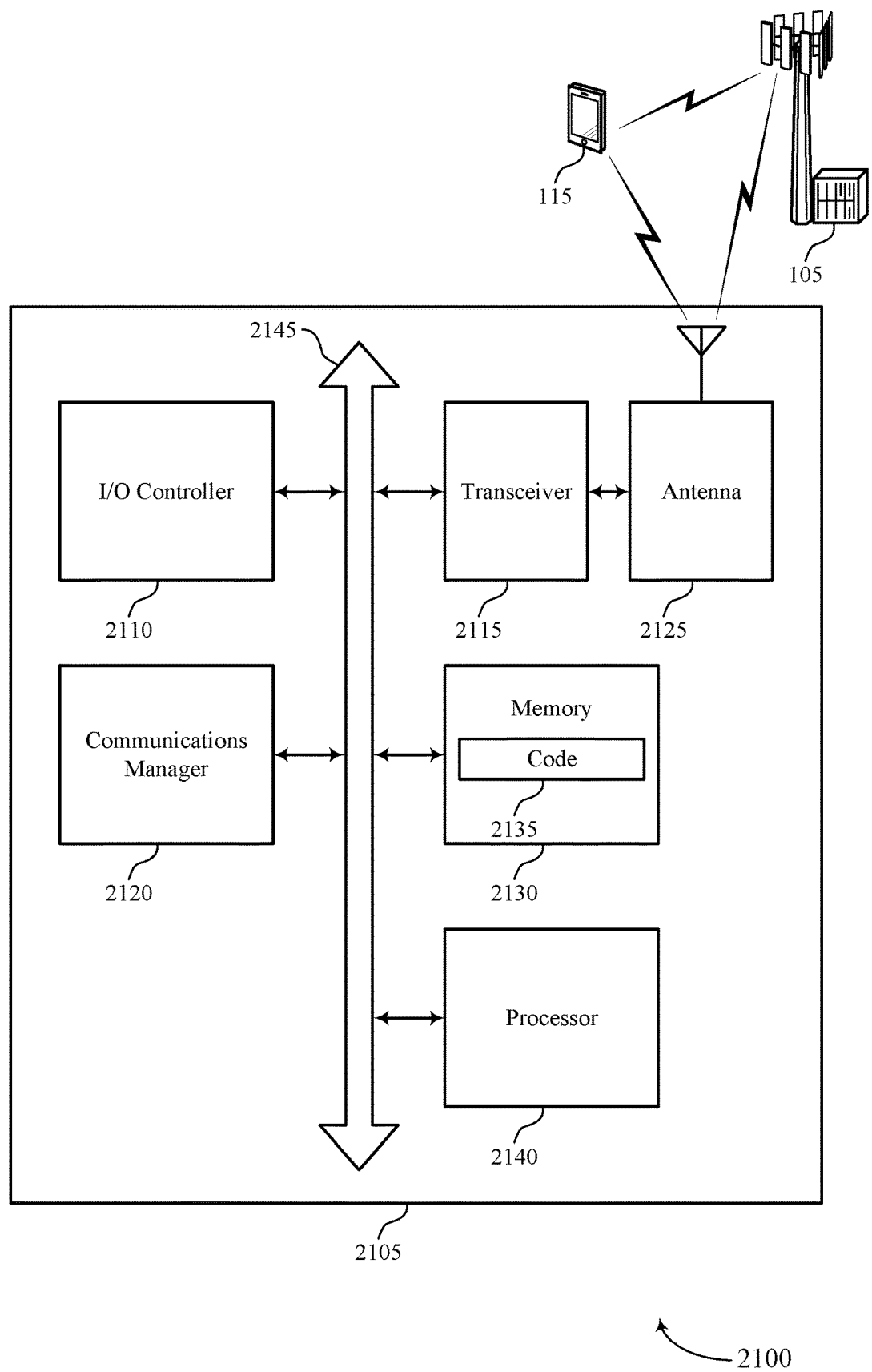
FIG. 21 shows a diagram of a system including a device that supports CLI reporting configuration and payload design in accordance with one or more aspects of the present disclosure.

FIG. 21 shows a diagram of a system 2100 including a device 2105 that supports CLI reporting configuration and payload design in accordance with one or more aspects of the present disclosure. The device 2105 may be an example of or include the components of a device 1805, a device 1905, or a UE 115 as described herein. The device 2105 may communicate (e.g., wirelessly) with one or more network entities 105, one or more UEs 115, or any combination thereof. The device 2105 may include components for bi-directional voice and data communications including components for transmitting and receiving communications, such as a communications manager 2120, an input/output (I/O) controller 2110, a transceiver 2115, an antenna 2125, a memory 2130, code 2135, and a processor 2140. These components may be in electronic communication or otherwise coupled (e.g., operatively, communicatively, functionally, electronically, electrically) via one or more buses (e.g., a bus 2145).

The I/O controller 2110 may manage input and output signals for the device 2105. The I/O controller 2110 may also manage peripherals not integrated into the device 2105. In some cases, the I/O controller 2110 may represent a physical connection or port to an external peripheral. In some cases, the I/O controller 2110 may utilize an operating system such as iOS®, ANDROID®, MS-DOS®, MS-WINDOWS®, OS/2®, UNIX®, LINUX®, or another known operating system. Additionally or alternatively, the I/O controller 2110 may represent or interact with a modem, a keyboard, a mouse, a touchscreen, or a similar device. In some cases, the I/O controller 2110 may be implemented as part of a processor, such as the processor 2140. In some cases, a user may interact with the device 2105 via the I/O controller 2110 or via hardware components controlled by the I/O controller 2110.

In some cases, the device 2105 may include a single antenna 2125. However, in some other cases, the device 2105 may have more than one antenna 2125, which may be capable of concurrently transmitting or receiving multiple wireless transmissions. The transceiver 2115 may communicate bi-directionally, via the one or more antennas 2125, wired, or wireless links as described herein. For example, the transceiver 2115 may represent a wireless transceiver and may communicate bi-directionally with another wireless transceiver. The transceiver 2115 may also include a modem to modulate the packets, to provide the modulated packets to one or more antennas 2125 for transmission, and to demodulate packets received from the one or more antennas 2125. The transceiver 2115, or the transceiver 2115 and one or more antennas 2125, may be an example of a transmitter 1815, a transmitter 1915, a receiver 1810, a receiver 1910, or any combination thereof or component thereof, as described herein.

The memory 2130 may include random access memory (RAM) and read-only memory (ROM). The memory 2130 may store computer-readable, computer-executable code 2135 including instructions that, when executed by the processor 2140, cause the device 2105 to perform various functions described herein. The code 2135 may be stored in a non-transitory computer-readable medium such as system memory or another type of memory. In some cases, the code 2135 may not be directly executable by the processor 2140 but may cause a computer (e.g., when compiled and executed) to perform functions described herein. In some cases, the memory 2130 may contain, among other things, a basic I/O system (BIOS) which may control basic hardware or software operation such as the interaction with peripheral components or devices.

The processor 2140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some other cases, a memory controller may be integrated into the processor 2140. The processor 2140 may be configured to execute computer-readable instructions stored in a memory (e.g., the memory 2130) to cause the device 2105 to perform various functions (e.g., functions or tasks supporting CLI reporting configuration and payload design). For example, the device 2105 or a component of the device 2105 may include a processor 2140 and memory 2130 coupled with or to the processor 2140, the processor 2140 and memory 2130 configured to perform various functions described herein.

The communications manager 2120 may support wireless communication at a UE in accordance with examples as disclosed herein. For example, the communications manager 2120 may be configured as or otherwise support a means for receiving first signaling indicating a first configuration including a first set of resources for channel state information measurements and a second set of resources for first cross-link interference measurements. The communications manager 2120 may be configured as or otherwise support a means for performing the channel state information measurements on the first set of resources and the first cross-link interference measurements on the second set of resources. The communications manager 2120 may be configured as or otherwise support a means for generating first channel state feedback based on the channel state information measurements and the first cross-link interference measurements. The communications manager 2120 may be configured as or otherwise support a means for reporting the first channel state feedback.

Additionally, or alternatively, the communications manager 2120 may support wireless communication at a UE in accordance with examples as disclosed herein. For example, the communications manager 2120 may be configured as or otherwise support a means for receiving sounding reference signals on a set of resources configured for cross-link interference measurements. The communications manager 2120 may be configured as or otherwise support a means for performing the cross-link interference measurements on the sounding reference signals. The communications manager 2120 may be configured as or otherwise support a means for generating a cross-link interference report including a first set of fields including indicators of at least a subset of the cross-link interference measurements and a second set of fields including the at least the subset of the cross-link interference measurements. The communications manager 2120 may be configured as or otherwise support a means for transmitting the cross-link interference report.

By including or configuring the communications manager 2120 in accordance with examples as described herein, the device 2105 may support techniques for reduced processing, reduced power consumption, and more efficient utilization of communication resources. In particular, because device 2105 may support efficient techniques for performing CLI and reporting based on the CLI measurements, a network entity may be able to schedule communications at the UE based on the report to minimize CLI at the device 2105. Accordingly, communications at the device 2105 may be more reliable and excessive retransmissions may be avoided, resulting in the reduced processing, the reduced power consumption, and the more efficient utilization of communication resources.

In some examples, the communications manager 2120 may be configured to perform various operations (e.g., receiving, monitoring, transmitting) using or otherwise in cooperation with the transceiver 2115, the one or more antennas 2125, or any combination thereof. Although the communications manager 2120 is illustrated as a separate component, in some examples, one or more functions described with reference to the communications manager 2120 may be supported by or performed by the processor 2140, the memory 2130, the code 2135, or any combination thereof. For example, the code 2135 may include instructions executable by the processor 2140 to cause the device 2105 to perform various aspects of CLI reporting configuration and payload design as described herein, or the processor 2140 and the memory 2130 may be otherwise configured to perform or support such operations.

Figure 22:
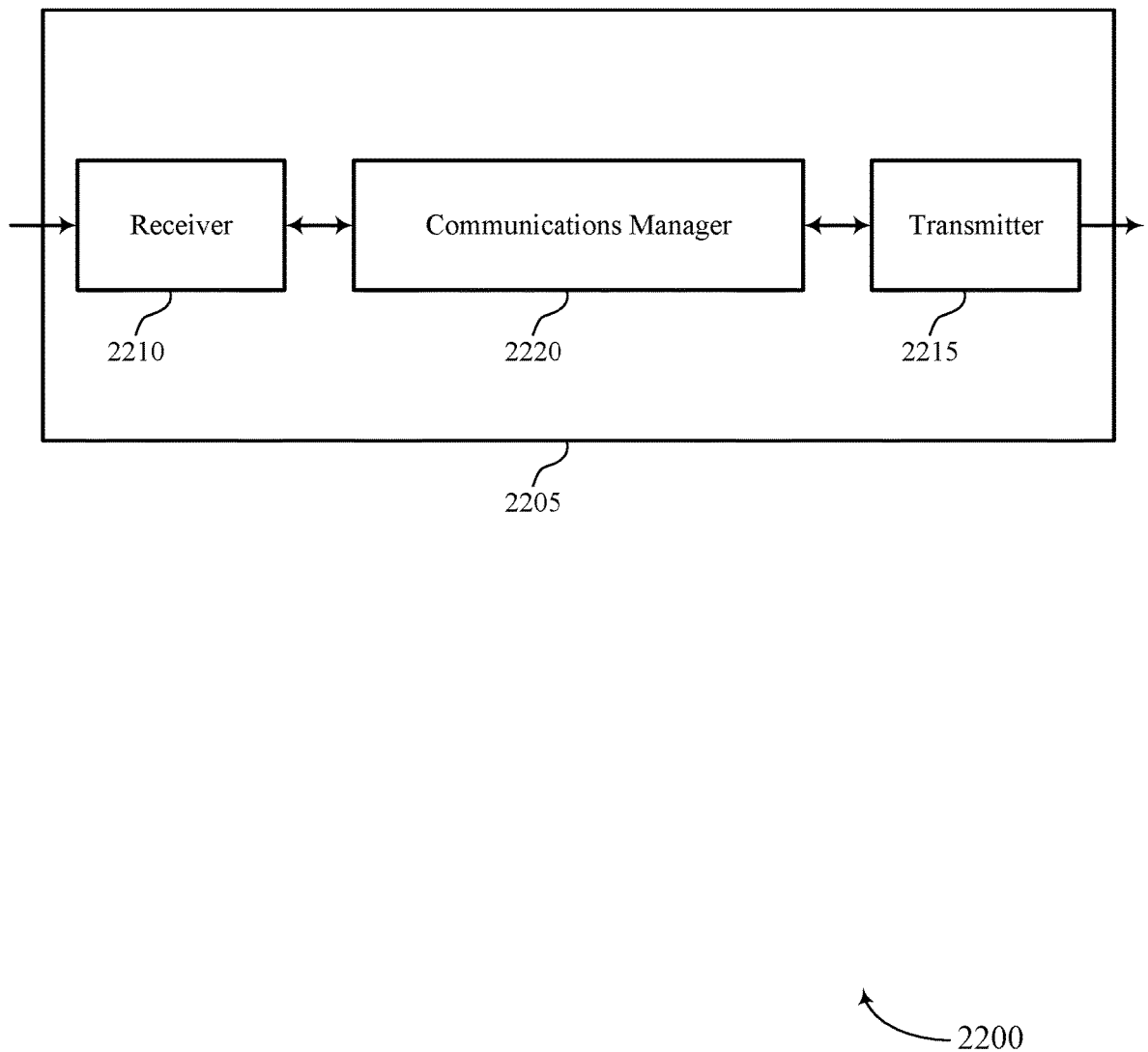
FIGS. 22 and 23 show block diagrams of devices that support CLI reporting configuration and payload design in accordance with one or more aspects of the present disclosure.

FIG. 22 shows a block diagram 2200 of a device 2205 that supports CLI reporting configuration and payload design in accordance with one or more aspects of the present disclosure. The device 2205 may be an example of aspects of a network entity 105 as described herein. The device 2205 may include a receiver 2210, a transmitter 2215, and a communications manager 2220. The device 2205 may also include a processor. Each of these components may be in communication with one another (e.g., via one or more buses).

The receiver 2210 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 2205. In some examples, the receiver 2210 may support obtaining information by receiving signals via one or more antennas. Additionally, or alternatively, the receiver 2210 may support obtaining information by receiving signals via one or more wired (e.g., electrical, fiber optic) interfaces, wireless interfaces, or any combination thereof.

The transmitter 2215 may provide a means for outputting (e.g., transmitting, providing, conveying, sending) information generated by other components of the device 2205. For example, the transmitter 2215 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 2215 may support outputting information by transmitting signals via one or more antennas. Additionally, or alternatively, the transmitter 2215 may support outputting information by transmitting signals via one or more wired (e.g., electrical, fiber optic) interfaces, wireless interfaces, or any combination thereof. In some examples, the transmitter 2215 and the receiver 2210 may be co-located in a transceiver, which may include or be coupled with a modem.

The communications manager 2220, the receiver 2210, the transmitter 2215, or various combinations thereof or various components thereof may be examples of means for performing various aspects of CLI reporting configuration and payload design as described herein. For example, the communications manager 2220, the receiver 2210, the transmitter 2215, or various combinations or components thereof may support a method for performing one or more of the functions described herein.

In some examples, the communications manager 2220, the receiver 2210, the transmitter 2215, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 2220, the receiver 2210, the transmitter 2215, or various combinations or components thereof may be implemented in code (e.g., as communications management software or firmware) executed by a processor. If implemented in code executed by a processor, the functions of the communications manager 2220, the receiver 2210, the transmitter 2215, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 2220 may be configured to perform various operations (e.g., receiving, obtaining, monitoring, outputting, transmitting) using or otherwise in cooperation with the receiver 2210, the transmitter 2215, or both. For example, the communications manager 2220 may receive information from the receiver 2210, send information to the transmitter 2215, or be integrated in combination with the receiver 2210, the transmitter 2215, or both to obtain information, output information, or perform various other operations as described herein.

The communications manager 2220 may support wireless communication at a network entity in accordance with examples as disclosed herein. For example, the communications manager 2220 may be configured as or otherwise support a means for receiving, from a first UE, an indication of a first signal-to-interference-plus-noise ratio computed at the first UE based on first cross-link interference measurements performed at the first UE. The communications manager 2220 may be configured as or otherwise support a means for transmitting, based on the first signal-to-interference-plus-noise ratio, a trigger for a third UE to transmit sounding reference signals to the first UE for second cross-link interference measurements at the first UE. The communications manager 2220 may be configured as or otherwise support a means for receiving, from the first UE, an indication of a second signal-to-interference-plus-noise ratio computed at the first UE based on the second cross-link interference measurements performed at the first UE. The communications manager 2220 may be configured as or otherwise support a means for scheduling communications with the first UE basing at least in part on the first signal-to-interference-plus-noise ratio and the second signal-to-interference-plus-noise ratio.

By including or configuring the communications manager 2220 in accordance with examples as described herein, the device 2205 (e.g., a processor controlling or otherwise coupled with the receiver 2210, the transmitter 2215, the communications manager 2220, or a combination thereof) may support techniques for reduced processing, reduced power consumption, and more efficient utilization of communication resources. In particular, because the device 2205 may receive a report based on CLI measurements performed at a UE, the device 2205 may be able to schedule communications at the UE based on the report to minimize CLI at the UE. Accordingly, communications at the UE may be more reliable and excessive retransmissions may be avoided, resulting in the reduced processing, the reduced power consumption, and the more efficient utilization of communication resources.

Figure 23:
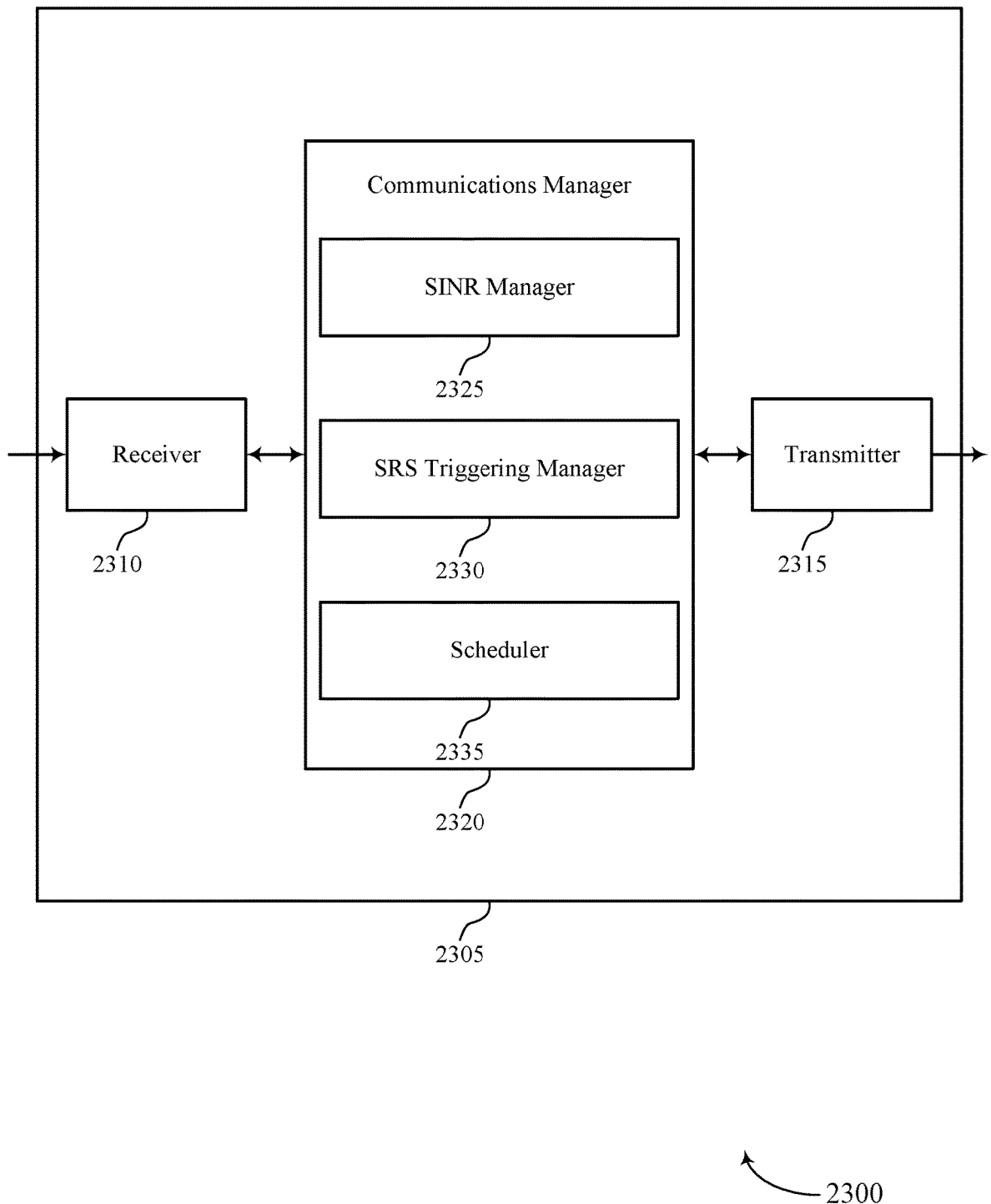

FIG. 23 shows a block diagram 2300 of a device 2305 that supports CLI reporting configuration and payload design in accordance with one or more aspects of the present disclosure. The device 2305 may be an example of aspects of a device 2205 or a network entity 105 as described herein. The device 2305 may include a receiver 2310, a transmitter 2315, and a communications manager 2320. The device 2305 may also include a processor. Each of these components may be in communication with one another (e.g., via one or more buses).

The receiver 2310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 2305. In some examples, the receiver 2310 may support obtaining information by receiving signals via one or more antennas. Additionally, or alternatively, the receiver 2310 may support obtaining information by receiving signals via one or more wired (e.g., electrical, fiber optic) interfaces, wireless interfaces, or any combination thereof.

The transmitter 2315 may provide a means for outputting (e.g., transmitting, providing, conveying, sending) information generated by other components of the device 2305. For example, the transmitter 2315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 2315 may support outputting information by transmitting signals via one or more antennas. Additionally, or alternatively, the transmitter 2315 may support outputting information by transmitting signals via one or more wired (e.g., electrical, fiber optic) interfaces, wireless interfaces, or any combination thereof. In some examples, the transmitter 2315 and the receiver 2310 may be co-located in a transceiver, which may include or be coupled with a modem.

The device 2305, or various components thereof, may be an example of means for performing various aspects of CLI reporting configuration and payload design as described herein. For example, the communications manager 2320 may include an SINR manager 2325, an SRS triggering manager 2330, a scheduler 2335, or any combination thereof. The communications manager 2320 may be an example of aspects of a communications manager 2220 as described herein. In some examples, the communications manager 2320, or various components thereof, may be configured to perform various operations (e.g., receiving, obtaining, monitoring, outputting, transmitting) using or otherwise in cooperation with the receiver 2310, the transmitter 2315, or both. For example, the communications manager 2320 may receive information from the receiver 2310, send information to the transmitter 2315, or be integrated in combination with the receiver 2310, the transmitter 2315, or both to obtain information, output information, or perform various other operations as described herein.

The communications manager 2320 may support wireless communication at a network entity in accordance with examples as disclosed herein. The SINR manager 2325 may be configured as or otherwise support a means for receiving, from a first UE, an indication of a first signal-to-interference-plus-noise ratio computed at the first UE based on first cross-link interference measurements performed at the first UE. The SRS triggering manager 2330 may be configured as or otherwise support a means for transmitting, based on the first signal-to-interference-plus-noise ratio, a trigger for a third UE to transmit sounding reference signals to the first UE for second cross-link interference measurements at the first UE. The SINR manager 2325 may be configured as or otherwise support a means for receiving, from the first UE, an indication of a second signal-to-interference-plus-noise ratio computed at the first UE based on the second cross-link interference measurements performed at the first UE. The scheduler 2335 may be configured as or otherwise support a means for scheduling communications with the first UE based on the first signal-to-interference-plus-noise ratio and the second signal-to-interference-plus-noise ratio.

Figure 24:
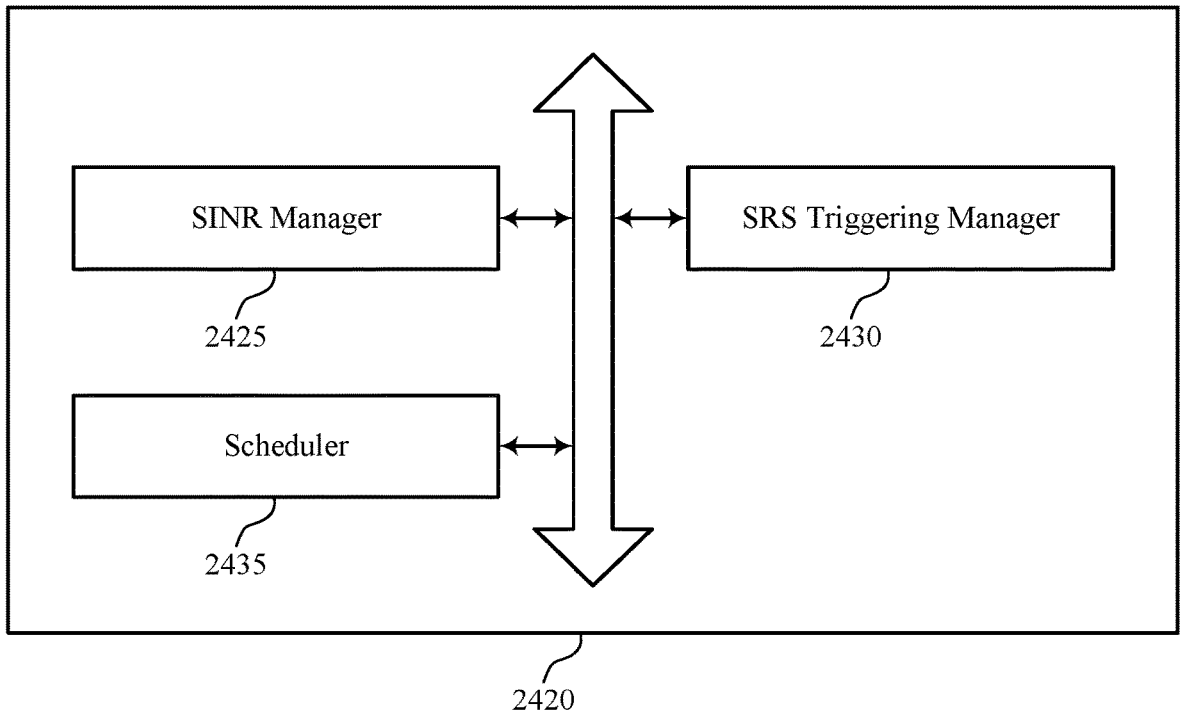
FIG. 24 shows a block diagram of a communications manager that supports CLI reporting configuration and payload design in accordance with one or more aspects of the present disclosure.

FIG. 24 shows a block diagram 2400 of a communications manager 2420 that supports CLI reporting configuration and payload design in accordance with one or more aspects of the present disclosure. The communications manager 2420 may be an example of aspects of a communications manager 2220, a communications manager 2320, or both, as described herein. The communications manager 2420, or various components thereof, may be an example of means for performing various aspects of CLI reporting configuration and payload design as described herein. For example, the communications manager 2420 may include an SINR manager 2425, an SRS triggering manager 2430, a scheduler 2435, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 2420 may support wireless communication at a network entity in accordance with examples as disclosed herein. The SINR manager 2425 may be configured as or otherwise support a means for receiving, from a first UE, an indication of a first signal-to-interference-plus-noise ratio computed at the first UE based on first cross-link interference measurements performed at the first UE. The SRS triggering manager 2430 may be configured as or otherwise support a means for transmitting, based on the first signal-to-interference-plus-noise ratio, a trigger for a third UE to transmit sounding reference signals to the first UE for second cross-link interference measurements at the first UE. In some examples, the SINR manager 2425 may be configured as or otherwise support a means for receiving, from the first UE, an indication of a second signal-to-interference-plus-noise ratio computed at the first UE based on the second cross-link interference measurements performed at the first UE. The scheduler 2435 may be configured as or otherwise support a means for scheduling communications with the first UE based on the first signal-to-interference-plus-noise ratio and the second signal-to-interference-plus-noise ratio.

Figure 25:
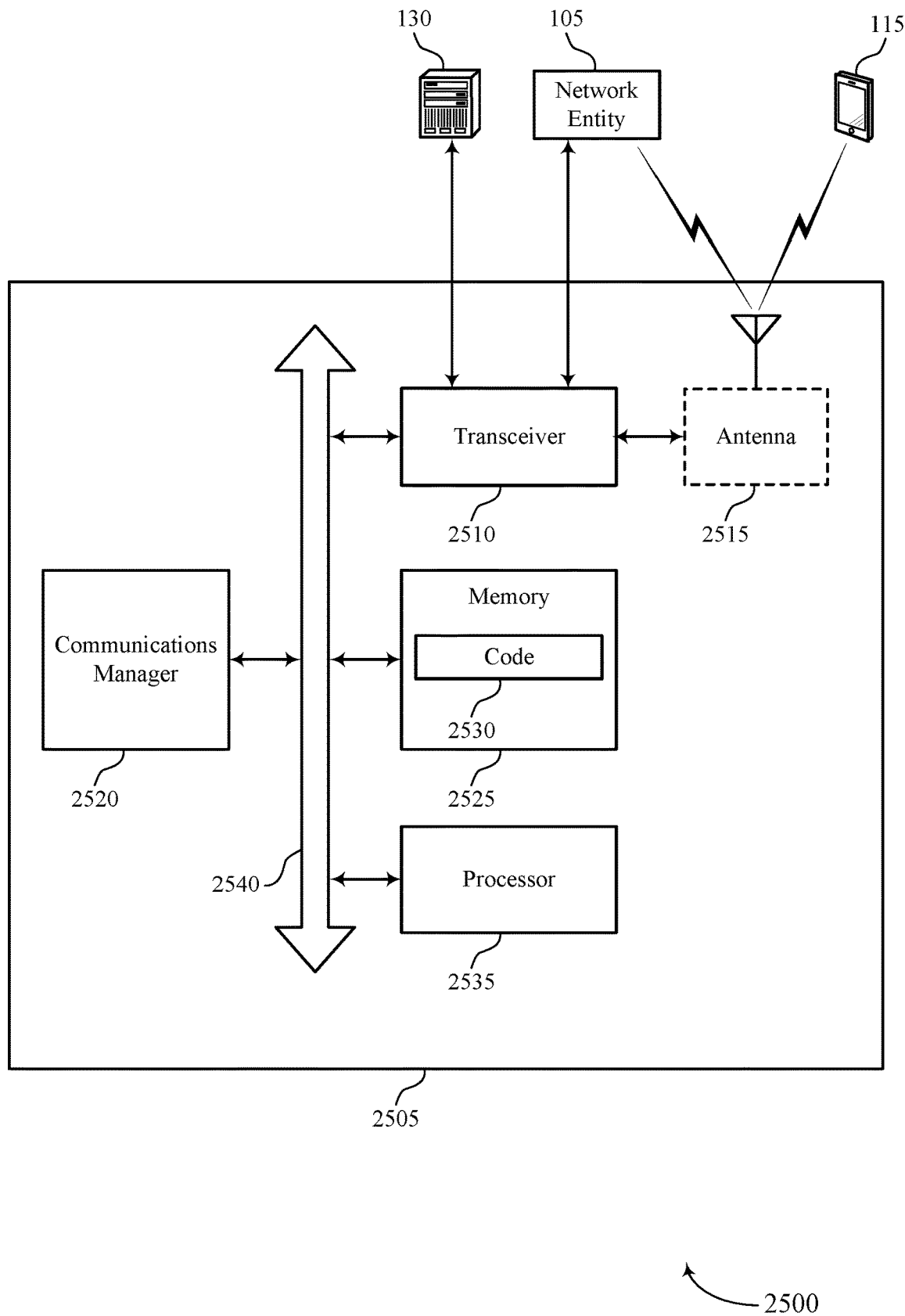
FIG. 25 shows a diagram of a system including a device that supports CLI reporting configuration and payload design in accordance with one or more aspects of the present disclosure.

FIG. 25 shows a diagram of a system 2500 including a device 2505 that supports CLI reporting configuration and payload design in accordance with one or more aspects of the present disclosure. The device 2505 may be an example of or include the components of a device 2205, a device 2305, or a network entity 105 as described herein. The device 2505 may communicate with one or more network entities 105, one or more UEs 115, or any combination thereof, which may include communications over one or more wired interfaces, over one or more wireless interfaces, or any combination thereof. The device 2505 may include components that support outputting and obtaining communications, such as a communications manager 2520, a transceiver 2510, an antenna 2515, a memory 2525, code 2530, and a processor 2535. These components may be in electronic communication or otherwise coupled (e.g., operatively, communicatively, functionally, electronically, electrically) via one or more buses (e.g., a bus 2540).

The transceiver 2510 may support bi-directional communications via wired links, wireless links, or both as described herein. In some examples, the transceiver 2510 may include a wired transceiver and may communicate bi-directionally with another wired transceiver. Additionally, or alternatively, in some examples, the transceiver 2510 may include a wireless transceiver and may communicate bi-directionally with another wireless transceiver. In some examples, the device 2505 may include one or more antennas 2515, which may be capable of transmitting or receiving wireless transmissions (e.g., concurrently). The transceiver 2510 may also include a modem to modulate signals, to provide the modulated signals for transmission (e.g., by one or more antennas 2515, by a wired transmitter), to receive modulated signals (e.g., from one or more antennas 2515, from a wired receiver), and to demodulate signals. The transceiver 2510, or the transceiver 2510 and one or more antennas 2515 or wired interfaces, where applicable, may be an example of a transmitter 2215, a transmitter 2315, a receiver 2210, a receiver 2310, or any combination thereof or component thereof, as described herein. In some examples, the transceiver may be operable to support communications via one or more communications links (e.g., a communication link 125, a backhaul communication link 120, a midhaul communication link 162, a fronthaul communication link 168).

The memory 2525 may include RAM and ROM. The memory 2525 may store computer-readable, computer-executable code 2530 including instructions that, when executed by the processor 2535, cause the device 2505 to perform various functions described herein. The code 2530 may be stored in a non-transitory computer-readable medium such as system memory or another type of memory. In some cases, the code 2530 may not be directly executable by the processor 2535 but may cause a computer (e.g., when compiled and executed) to perform functions described herein. In some cases, the memory 2525 may contain, among other things, a BIOS which may control basic hardware or software operation such as the interaction with peripheral components or devices.

The processor 2535 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 2535 may be configured to operate a memory array using a memory controller. In some other cases, a memory controller may be integrated into the processor 2535. The processor 2535 may be configured to execute computer-readable instructions stored in a memory (e.g., the memory 2525) to cause the device 2505 to perform various functions (e.g., functions or tasks supporting CLI reporting configuration and payload design). For example, the device 2505 or a component of the device 2505 may include a processor 2535 and memory 2525 coupled with the processor 2535, the processor 2535 and memory 2525 configured to perform various functions described herein. The processor 2535 may be an example of a cloud-computing platform (e.g., one or more physical nodes and supporting software such as operating systems, virtual machines, or container instances) that may host the functions (e.g., by executing code 2530) to perform the functions of the device 2505.

In some examples, a bus 2540 may support communications of (e.g., within) a protocol layer of a protocol stack. In some examples, a bus 2540 may support communications associated with a logical channel of a protocol stack (e.g., between protocol layers of a protocol stack), which may include communications performed within a component of the device 2505, or between different components of the device 2505 that may be co-located or located in different locations (e.g., where the device 2505 may refer to a system in which one or more of the communications manager 2520, the transceiver 2510, the memory 2525, the code 2530, and the processor 2535 may be located in one of the different components or divided between different components).

In some examples, the communications manager 2520 may manage aspects of communications with a core network 130 (e.g., via one or more wired or wireless backhaul links). For example, the communications manager 2520 may manage the transfer of data communications for client devices, such as one or more UEs 115. In some examples, the communications manager 2520 may manage communications with other network entities 105, and may include a controller or scheduler for controlling communications with UEs 115 in cooperation with other network entities 105. In some examples, the communications manager 2520 may support an X2 interface within an LTE/LTE-A wireless communications network technology to provide communication between network entities 105.

The communications manager 2520 may support wireless communication at a network entity in accordance with examples as disclosed herein. For example, the communications manager 2520 may be configured as or otherwise support a means for receiving, from a first UE, an indication of a first signal-to-interference-plus-noise ratio computed at the first UE based on first cross-link interference measurements performed at the first UE. The communications manager 2520 may be configured as or otherwise support a means for transmitting, based on the first signal-to-interference-plus-noise ratio, a trigger for a third UE to transmit sounding reference signals to the first UE for second cross-link interference measurements at the first UE. The communications manager 2520 may be configured as or otherwise support a means for receiving, from the first UE, an indication of a second signal-to-interference-plus-noise ratio computed at the first UE based on the second cross-link interference measurements performed at the first UE. The communications manager 2520 may be configured as or otherwise support a means for scheduling communications with the first UE basing at least in part on the first signal-to-interference-plus-noise ratio and the second signal-to-interference-plus-noise ratio.

By including or configuring the communications manager 2520 in accordance with examples as described herein, the device 2505 may support techniques for reduced processing, reduced power consumption, and more efficient utilization of communication resources. In particular, because the device 2505 may receive a report based on CLI measurements performed at a UE, the device 2505 may be able to schedule communications at the UE based on the report to minimize CLI at the UE. Accordingly, communications at the UE may be more reliable and excessive retransmissions may be avoided, resulting in the reduced processing, the reduced power consumption, and the more efficient utilization of communication resources.

In some examples, the communications manager 2520 may be configured to perform various operations (e.g., receiving, obtaining, monitoring, outputting, transmitting) using or otherwise in cooperation with the transceiver 2510, the one or more antennas 2515 (e.g., where applicable), or any combination thereof. Although the communications manager 2520 is illustrated as a separate component, in some examples, one or more functions described with reference to the communications manager 2520 may be supported by or performed by the processor 2535, the memory 2525, the code 2530, the transceiver 2510, or any combination thereof. For example, the code 2530 may include instructions executable by the processor 2535 to cause the device 2505 to perform various aspects of CLI reporting configuration and payload design as described herein, or the processor 2535 and the memory 2525 may be otherwise configured to perform or support such operations.

Figure 26:
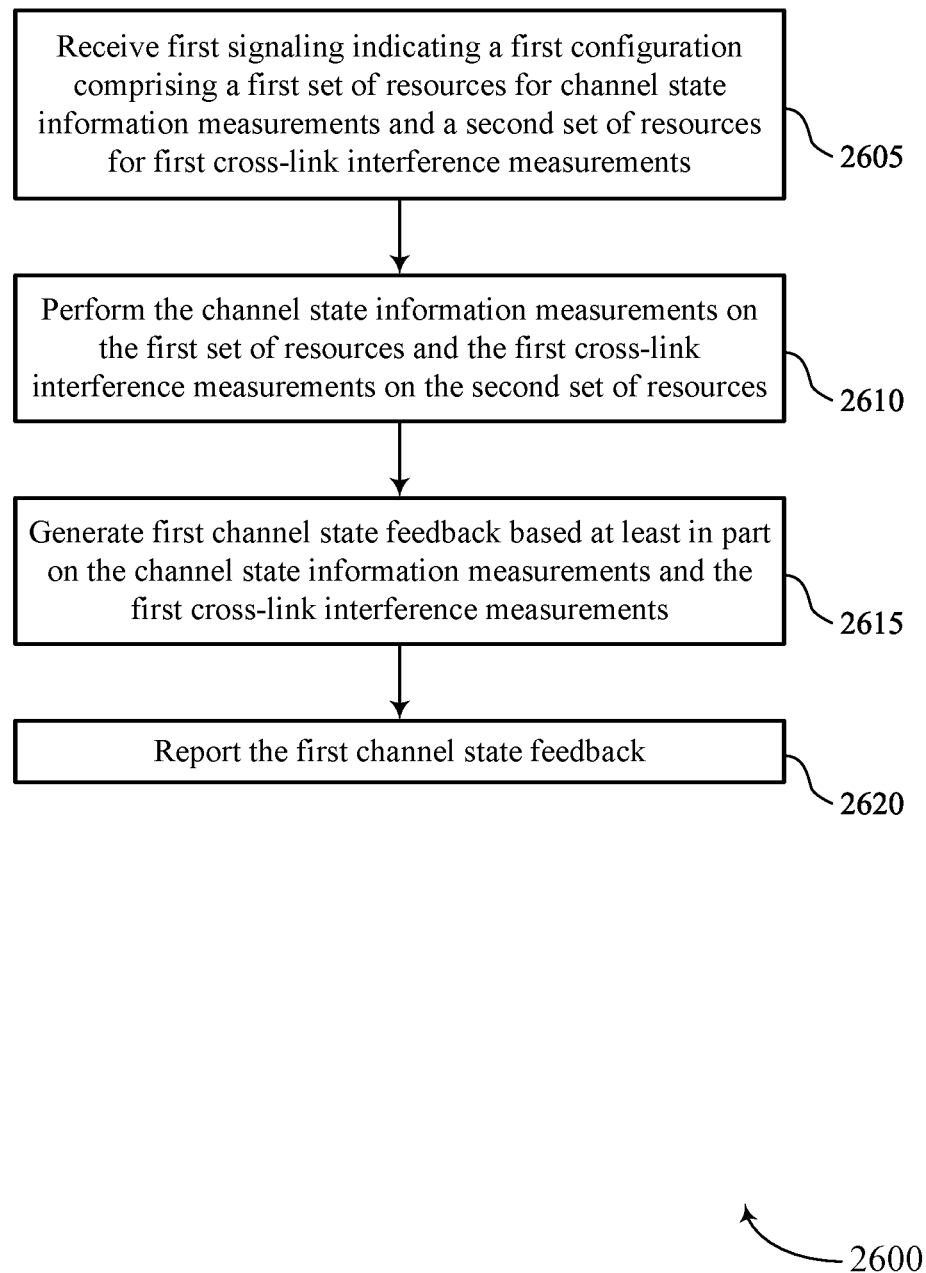
FIGS. 26 through 28 show flowcharts illustrating methods that support CLI reporting configuration and payload design in accordance with one or more aspects of the present disclosure.

FIG. 26 shows a flowchart illustrating a method 2600 that supports CLI reporting configuration and payload design in accordance with one or more aspects of the present disclosure. The operations of the method 2600 may be implemented by a UE or its components as described herein. For example, the operations of the method 2600 may be performed by a UE 115 as described with reference to FIGS. 1 through 21. In some examples, a UE may execute a set of instructions to control the functional elements of the UE to perform the described functions. Additionally, or alternatively, the UE may perform aspects of the described functions using special-purpose hardware.

At 2605, the method may include receiving first signaling indicating a first configuration including a first set of resources for channel state information measurements and a second set of resources for first cross-link interference measurements. The operations of 2605 may be performed in accordance with examples as disclosed herein. In some examples, aspects of the operations of 2605 may be performed by a configuration manager 2025 as described with reference to FIG. 20.

At 2610, the method may include performing the channel state information measurements on the first set of resources and the first cross-link interference measurements on the second set of resources. The operations of 2610 may be performed in accordance with examples as disclosed herein. In some examples, aspects of the operations of 2610 may be performed by a measurement manager 2030 as described with reference to FIG. 20.

At 2615, the method may include generating first channel state feedback based on the channel state information measurements and the first cross-link interference measurements. The operations of 2615 may be performed in accordance with examples as disclosed herein. In some examples, aspects of the operations of 2615 may be performed by an CSF manager 2035 as described with reference to FIG. 20.

At 2620, the method may include reporting the first channel state feedback. The operations of 2620 may be performed in accordance with examples as disclosed herein. In some examples, aspects of the operations of 2620 may be performed by an CSF manager 2035 as described with reference to FIG. 20.

Figure 27:
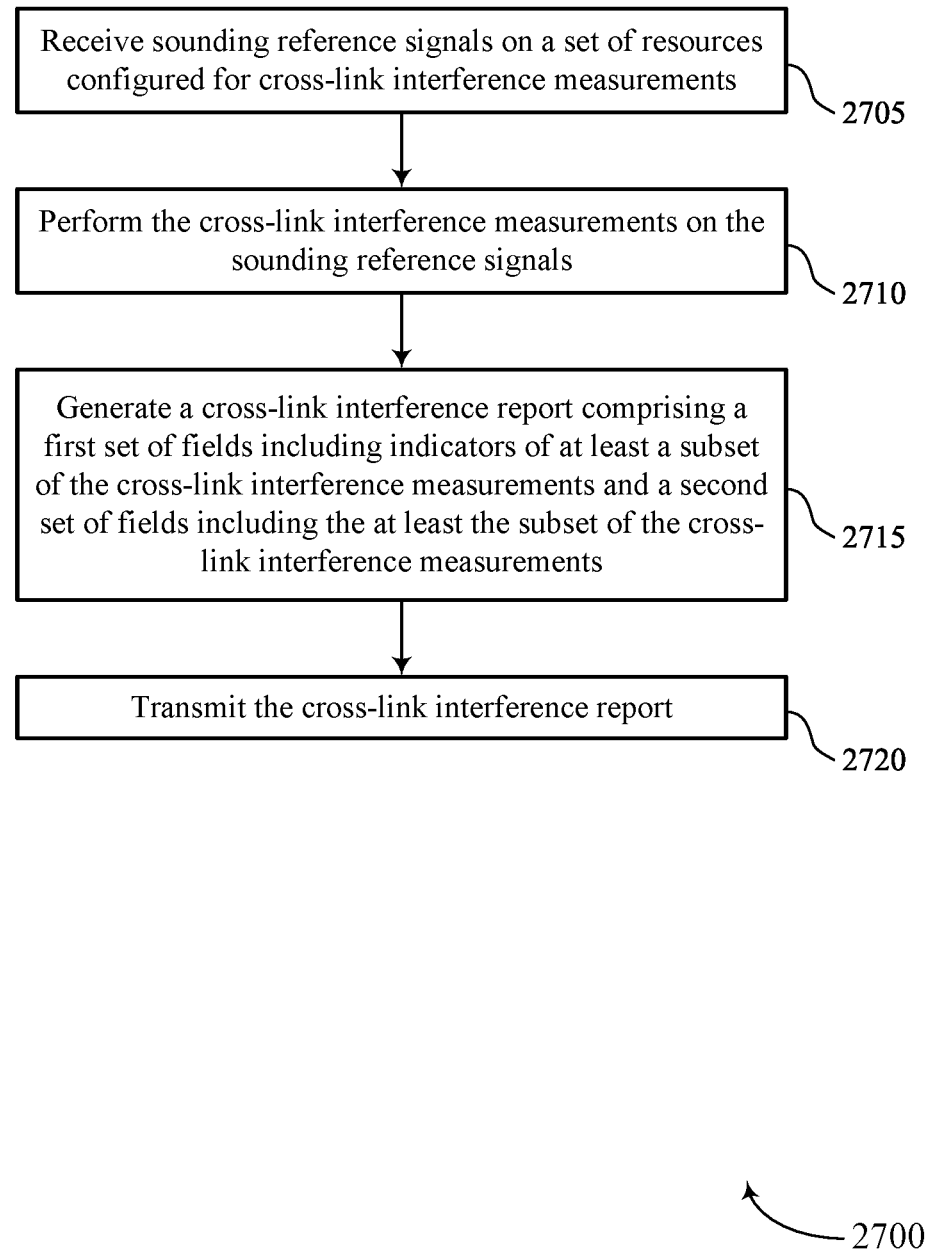

FIG. 27 shows a flowchart illustrating a method 2700 that supports CLI reporting configuration and payload design in accordance with one or more aspects of the present disclosure. The operations of the method 2700 may be implemented by a UE or its components as described herein. For example, the operations of the method 2700 may be performed by a UE 115 as described with reference to FIGS. 1 through 21. In some examples, a UE may execute a set of instructions to control the functional elements of the UE to perform the described functions. Additionally, or alternatively, the UE may perform aspects of the described functions using special-purpose hardware.

At 2705, the method may include receiving sounding reference signals on a set of resources configured for cross-link interference measurements. The operations of 2705 may be performed in accordance with examples as disclosed herein. In some examples, aspects of the operations of 2705 may be performed by an SRS manager 2040 as described with reference to FIG. 20.

At 2710, the method may include performing the cross-link interference measurements on the sounding reference signals. The operations of 2710 may be performed in accordance with examples as disclosed herein. In some examples, aspects of the operations of 2710 may be performed by a measurement manager 2030 as described with reference to FIG. 20.

At 2715, the method may include generating a cross-link interference report including a first set of fields including indicators of at least a subset of the cross-link interference measurements and a second set of fields including the at least the subset of the cross-link interference measurements. The operations of 2715 may be performed in accordance with examples as disclosed herein. In some examples, aspects of the operations of 2715 may be performed by a CLI manager 2045 as described with reference to FIG. 20.

At 2720, the method may include transmitting the cross-link interference report. The operations of 2720 may be performed in accordance with examples as disclosed herein. In some examples, aspects of the operations of 2720 may be performed by a CLI manager 2045 as described with reference to FIG. 20.

Figure 28:
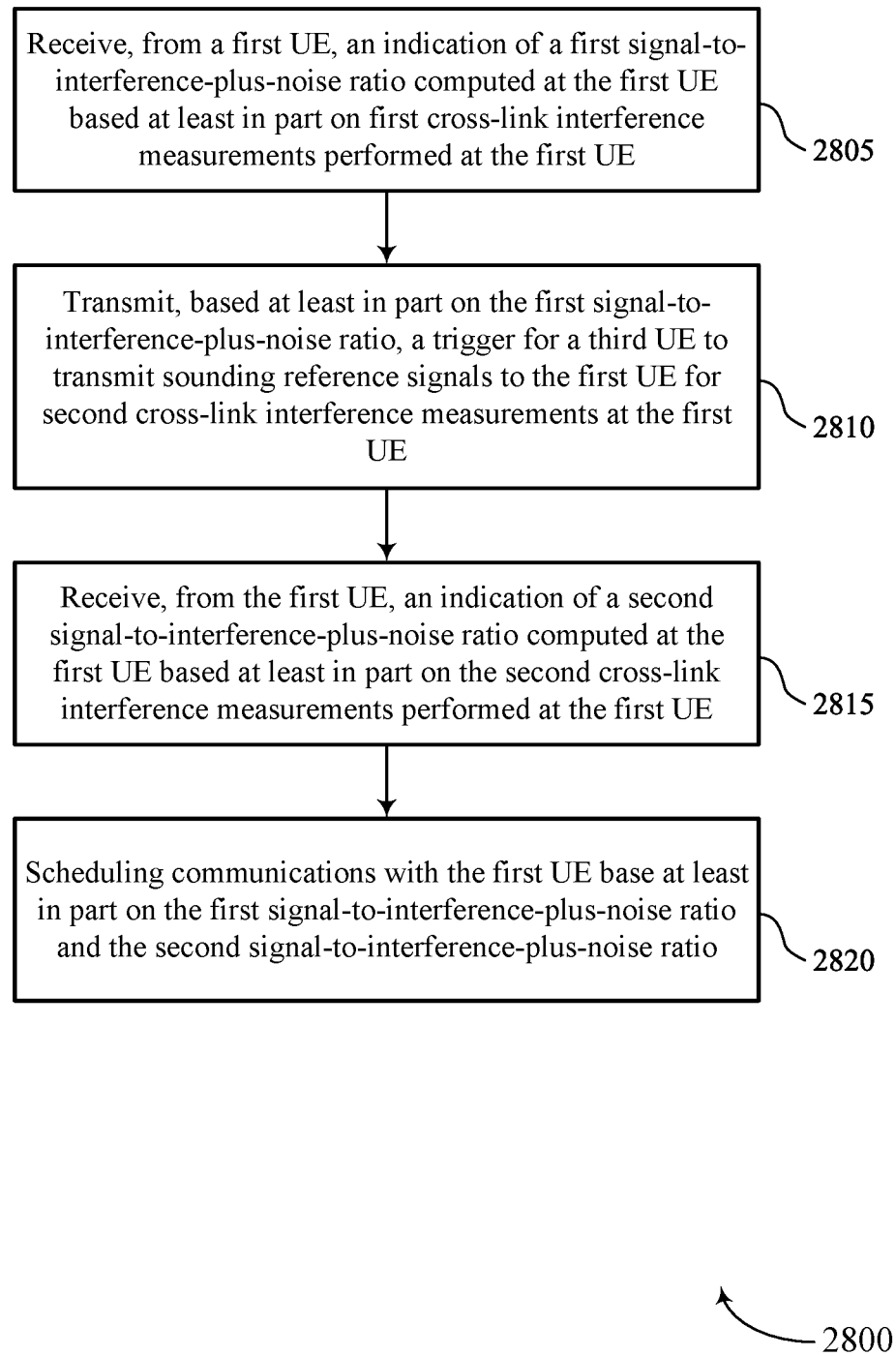

FIG. 28 shows a flowchart illustrating a method 2800 that supports CLI reporting configuration and payload design in accordance with one or more aspects of the present disclosure. The operations of the method 2800 may be implemented by a network entity or its components as described herein. For example, the operations of the method 2800 may be performed by a network entity as described with reference to FIGS. 1 through 17 and 22 through 25. In some examples, a network entity may execute a set of instructions to control the functional elements of the network entity to perform the described functions. Additionally, or alternatively, the network entity may perform aspects of the described functions using special-purpose hardware.

At 2805, the method may include receiving, from a first UE, an indication of a first signal-to-interference-plus-noise ratio computed at the first UE based on first cross-link interference measurements performed at the first UE. The operations of 2805 may be performed in accordance with examples as disclosed herein. In some examples, aspects of the operations of 2805 may be performed by an SINR manager 2425 as described with reference to FIG. 24.

At 2810, the method may include transmitting, based on the first signal-to-interference-plus-noise ratio, a trigger for a third UE to transmit sounding reference signals to the first UE for second cross-link interference measurements at the first UE. The operations of 2810 may be performed in accordance with examples as disclosed herein. In some examples, aspects of the operations of 2810 may be performed by an SRS triggering manager 2430 as described with reference to FIG. 24.

At 2815, the method may include receiving, from the first UE, an indication of a second signal-to-interference-plus-noise ratio computed at the first UE based on the second cross-link interference measurements performed at the first UE. The operations of 2815 may be performed in accordance with examples as disclosed herein. In some examples, aspects of the operations of 2815 may be performed by an SINR manager 2425 as described with reference to FIG. 24.

At 2820, the method may include scheduling communications with the first UE based on the first signal-to-interference-plus-noise ratio and the second signal-to-interference-plus-noise ratio. The operations of 2820 may be performed in accordance with examples as disclosed herein. In some examples, aspects of the operations of 2820 may be performed by a scheduler 2435 as described with reference to FIG. 24.

The following provides an overview of aspects of the present disclosure:

Aspect 1: A method for wireless communication at a UE, comprising: receiving first signaling indicating a first configuration comprising a first set of resources for channel state information measurements and a second set of resources for first cross-link interference measurements; performing the channel state information measurements on the first set of resources and the first cross-link interference measurements on the second set of resources; generating first channel state feedback based at least in part on the channel state information measurements and the first cross-link interference measurements; and reporting the first channel state feedback.

Aspect 2: The method of aspect 1, further comprising: reporting the first channel state feedback based at least in part on the first configuration excluding a metric to trigger reporting of the first cross-link interference measurements.

Aspect 3: The method of any of aspects 1 through 2, further comprising: receiving second signaling indicating a second configuration including a metric to trigger reporting of second cross-link interference measurements; and reporting the second cross-link interference measurements based at least in part on the metric.

Aspect 4: The method of any of aspects 1 through 3, further comprising: receiving channel state information reference signals on the first set of resources, wherein performing the channel state information measurements comprises: performing the channel state information measurements on the channel state information reference signals received on the first set of resources.

Aspect 5: The method of any of aspects 1 through 4, further comprising: receiving sounding reference signals on the second set of resources, wherein performing the first cross-link interference measurements comprises: performing the first cross-link interference measurements on the sounding reference signals received on the second set of resources.

Aspect 6: The method of any of aspects 1 through 5, wherein receiving the first signaling indicating the first configuration comprises: receiving the first signaling indicating the first configuration comprising a third set of resources for channel state information interference measurements, the method further comprising: performing the channel state information interference measurements on the third set of resources, wherein generating the first channel state feedback is further based at least in part on the channel state information interference measurements.

Aspect 7: A method for wireless communication at a UE, comprising: receiving sounding reference signals on a set of resources configured for cross-link interference measurements; performing the cross-link interference measurements on the sounding reference signals; generating a cross-link interference report comprising a first set of fields including indicators of at least a subset of the cross-link interference measurements and a second set of fields including the at least the subset of the cross-link interference measurements; and transmitting the cross-link interference report.

Aspect 8: The method of aspect 7, wherein performing the cross-link interference measurements comprises: performing up to a maximum quantity of cross-link interference measurements on the sounding reference signals.

Aspect 9: The method of any of aspects 7 through 8, wherein performing the cross-link interference measurements comprises: performing a plurality of cross-link interference measurements on the sounding reference signals, wherein the at least the subset of the cross-link interference measurements comprises up to a maximum quantity of cross-link interference measurements.

Aspect 10: The method of aspect 9, wherein the at least the subset of the cross-link interference measurements comprises a highest set of cross-link interference measurements of the plurality of cross-link interference measurements.

Aspect 11: The method of any of aspects 9 through 10, wherein performing the plurality of cross-link interference measurements comprises: performing the plurality of cross-link interference measurements on each of a plurality of subbands using a plurality of beams, wherein the at least the subset of the cross-link interference measurements comprises a highest cross-link interference measurement for each subband of the plurality of subbands.

Aspect 12: The method of any of aspects 7 through 11, wherein generating the cross-link interference report comprises: generating a first part of the cross-link interference report comprising a first subset of the cross-link interference measurements and a second part of the cross-link interference report comprising a second subset of the cross-link interference measurements based at least in part on a quantity of the cross-link interference measurements exceeding a threshold.

Aspect 13: The method of any of aspects 7 through 12, wherein the indicators included in the first set of fields indicate, for each cross-link interference measurement included in the cross-link interference report, a cross-link interference resource, a subband, a beam, or a combination thereof associated with the cross-link interference measurement.

Aspect 14: A method for wireless communication at a network entity, comprising: receiving, from a first UE, an indication of a first signal-to-interference-plus-noise ratio computed at the first UE based at least in part on first cross-link interference measurements performed at the first UE; transmitting, based at least in part on the first signal-to-interference-plus-noise ratio, a trigger for a third UE to transmit sounding reference signals to the first UE for second cross-link interference measurements at the first UE; receiving, from the first UE, an indication of a second signal-to-interference-plus-noise ratio computed at the first UE based at least in part on the second cross-link interference measurements performed at the first UE; and scheduling communications with the first UE based at least in part on the first signal-to-interference-plus-noise ratio and the second signal-to-interference-plus-noise ratio.

Aspect 15: An apparatus for wireless communication at a UE, comprising a processor; memory coupled with the processor; and instructions stored in the memory and executable by the processor to cause the apparatus to perform a method of any of aspects 1 through 6.

Aspect 16: An apparatus for wireless communication at a UE, comprising at least one means for performing a method of any of aspects 1 through 6.

Aspect 17: A non-transitory computer-readable medium storing code for wireless communication at a UE, the code comprising instructions executable by a processor to perform a method of any of aspects 1 through 6.

Aspect 18: An apparatus for wireless communication at a UE, comprising a processor; memory coupled with the processor; and instructions stored in the memory and executable by the processor to cause the apparatus to perform a method of any of aspects 7 through 13.

Aspect 19: An apparatus for wireless communication at a UE, comprising at least one means for performing a method of any of aspects 7 through 13.

Aspect 20: A non-transitory computer-readable medium storing code for wireless communication at a UE, the code comprising instructions executable by a processor to perform a method of any of aspects 7 through 13.

Aspect 21: An apparatus for wireless communication at a network entity, comprising a processor; memory coupled with the processor; and instructions stored in the memory and executable by the processor to cause the apparatus to perform a method of any of aspects 14 through 14.

Aspect 22: An apparatus for wireless communication at a network entity, comprising at least one means for performing a method of any of aspects 14 through 14.

Aspect 23: A non-transitory computer-readable medium storing code for wireless communication at a network entity, the code comprising instructions executable by a processor to perform a method of any of aspects 14 through 14.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, obtaining, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
one or more processors;
one or more memories coupled with the one or more processors; and
instructions stored in the one or more memories and executable by the one or more processors to cause the apparatus to:
receive sounding reference signals on a set of resources configured for cross-link interference measurements;
perform the cross-link interference measurements on the sounding reference signals; and
transmit a cross-link interference report comprising a first set of fields including respective indicators that correspond to at least a subset of the cross-link interference measurements and a second set of fields that occur subsequent to the first set of fields in the cross-link interference report, the second set of fields including the at least the subset of the cross-link interference measurements, wherein a first order of the respective indicators of the first set of fields corresponds to a second order of respective cross-link interference measurements of the second set of fields.

2. The apparatus of claim 1, wherein the instructions to perform the cross-link interference measurements are executable by the one or more processors to cause the apparatus to:
perform up to a maximum quantity of cross-link interference measurements on the sounding reference signals.

3. The apparatus of claim 1, wherein the instructions to perform the cross-link interference measurements are executable by the one or more processors to cause the apparatus to:
perform a plurality of cross-link interference measurements on the sounding reference signals, wherein the at least the subset of the cross-link interference measurements comprises up to a maximum quantity of cross-link interference measurements.

4. The apparatus of claim 3, wherein the at least the subset of the cross-link interference measurements comprises a highest set of cross-link interference measurements of the plurality of cross-link interference measurements.

5. The apparatus of claim 3, wherein the instructions to perform the plurality of cross-link interference measurements are executable by the one or more processors to cause the apparatus to:
perform the plurality of cross-link interference measurements on each of a plurality of subbands using a plurality of beams, wherein the at least the subset of the cross-link interference measurements comprises a highest cross-link interference measurement for each subband of the plurality of subbands.

6. The apparatus of claim 1, wherein the instructions to transmit the cross-link interference report are executable by the one or more processors to cause the apparatus to:
transmit a first part of the cross-link interference report comprising a first subset of the cross-link interference measurements and a second part of the cross-link interference report comprising a second subset of the cross-link interference measurements based at least in part on a quantity of the cross-link interference measurements exceeding a threshold.

7. The apparatus of claim 1, wherein the respective indicators included in the first set of fields indicate, for each cross-link interference measurement included in the cross-link interference report, a cross-link interference resource, a subband, a beam, or a combination thereof associated with each cross-link interference measurement.

8. A method for wireless communications at a user equipment (UE), comprising:
receiving sounding reference signals on a set of resources configured for cross-link interference measurements;
performing the cross-link interference measurements on the sounding reference signals; and
transmitting a cross-link interference report comprising a first set of fields including respective indicators that correspond to at least a subset of the cross-link interference measurements and a second set of fields that occur subsequent to the first set of fields in the cross-link interference report, the second set of fields including the at least the subset of the cross-link interference measurements, wherein a first order of the respective indicators of the first set of fields corresponds to a second order of respective cross-link interference measurements of the second set of fields.

9. The method of claim 8, wherein performing the cross-link interference measurements comprises:
performing up to a maximum quantity of cross-link interference measurements on the sounding reference signals.

10. The method of claim 8, wherein performing the cross-link interference measurements comprises:
performing a plurality of cross-link interference measurements on the sounding reference signals, wherein the at least the subset of the cross-link interference measurements comprises up to a maximum quantity of cross-link interference measurements.

11. The method of claim 10, wherein the at least the subset of the cross-link interference measurements comprises a highest set of cross-link interference measurements of the plurality of cross-link interference measurements.

12. The method of claim 10, wherein performing the cross-link interference measurements comprises:
performing the plurality of cross-link interference measurements on each of a plurality of subbands using a plurality of beams, wherein the at least the subset of the cross-link interference measurements comprises a highest cross-link interference measurement for each subband of the plurality of subbands.

13. The method of claim 8, wherein generating the cross-link interference report comprises:
generating a first part of the cross-link interference report comprising a first subset of the cross-link interference measurements and a second part of the cross-link interference report comprising a second subset of the cross-link interference measurements based at least in part on a quantity of the cross-link interference measurements exceeding a threshold.

14. The method of claim 8, wherein the respective indicators included in the first set of fields indicate, for each cross-link interference measurement included in the cross-link interference report, a cross-link interference resource, a subband, a beam, or a combination thereof associated with each cross-link interference measurement.

15. A user equipment (UE) for wireless communications, comprising:
means for receiving sounding reference signals on a set of resources configured for cross-link interference measurements;

means for performing the cross-link interference measurements on the sounding reference signals; and means for transmitting a cross-link interference report comprising a first set of fields including respective indicators that correspond to at least a subset of the cross-link interference measurements and a second set of fields that occur subsequent to the first set of fields in the cross-link interference report, the second set of fields including the at least the subset of the cross-link interference measurements, wherein a first order of the respective indicators of the first set of fields corresponds to a second order of respective cross-link interference measurements of the second set of fields.

16. The UE of claim 15, wherein the means for performing the cross-link interference measurements comprise:

means for performing up to a maximum quantity of cross-link interference measurements on the sounding reference signals.

17. The UE of claim 15, wherein the means for performing the cross-link interference measurements comprise:

means for performing a plurality of cross-link interference measurements on the sounding reference signals, wherein the at least the subset of the cross-link interference measurements comprises up to a maximum quantity of cross-link interference measurements.

18. The UE of claim 17, wherein the at least the subset of the cross-link interference measurements comprises a highest set of cross-link interference measurements of the plurality of cross-link interference measurements.

19. A non-transitory computer-readable medium storing code for wireless communications, the code comprising instructions executable by one or more processors to:

receive sounding reference signals on a set of resources configured for cross-link interference measurements;

perform the cross-link interference measurements on the sounding reference signals; and transmit a cross-link interference report comprising a first set of fields including a respective indicators that correspond to at least a subset of the cross-link interference measurements and a second set of fields that occur subsequent to the first set of fields in the cross-link interference report, the second set of fields including the at least the subset of the cross-link interference measurements, wherein a first order of the respective indicators of the first set of fields corresponds to a second order of respective cross-link interference measurements of the second set of fields.

20. The apparatus of claim 1, wherein the at least the subset of the cross-link interference measurements comprise reference signal strength indicator (RSSI) measurements.

* * * * *